US008769195B2

(12) United States Patent
Yamada et al.

(10) Patent No.: US 8,769,195 B2
(45) Date of Patent: Jul. 1, 2014

(54) STORAGE APPARATUS AND STORAGE APPARATUS CONTROL METHOD

(75) Inventors: Hidenori Yamada, Kawasaki (JP);
Takashi Kawada, Kawasaki (JP);
Yoshinari Shinozaki, Kawasaki (JP);
Shinichi Nishizono, Kawasaki (JP); Koji Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 462 days.

(21) Appl. No.: 13/009,383

(22) Filed: Jan. 19, 2011

(65) Prior Publication Data

US 2011/0197041 A1     Aug. 11, 2011

(30) Foreign Application Priority Data

Feb. 5, 2010 (JP) .................. 2010-024147

(51) Int. Cl.
G06F 12/16  (2006.01)
G06F 11/20  (2006.01)
G06F 13/16  (2006.01)
G06F 3/06   (2006.01)

(52) U.S. Cl.
CPC ........ G06F 11/2064 (2013.01); G06F 13/1621 (2013.01); *G06F 3/0613* (2013.01); *G06F 3/0614* (2013.01); *G06F 3/065* (2013.01); G06F 3/0653 (2013.01); G06F 3/0656 (2013.01); *G06F 3/067* (2013.01); *G06F 3/0683* (2013.01)
USPC ........... 711/112; 711/114; 711/143; 711/162; 711/E12.072; 711/E12.103; 710/52

(58) Field of Classification Search
CPC ... G06F 3/0613; G06F 3/0614; G06F 3/0617; G06F 3/0619; G06F 3/065; G06F 3/0653; G06F 3/0656; G06F 3/0683; G06F 3/0685; G06F 3/0686; G06F 3/0688; G06F 3/0689; G06F 11/2064; G06F 11/2071; G06F 12/0804; G06F 12/0868; G06F 13/1621
See application file for complete search history.

(56) References Cited

U.S. PATENT DOCUMENTS

| 5,781,716 | A  | * | 7/1998 | Hemphill et al. ............. 714/4.5 |
| 6,516,343 | B1 | * | 2/2003 | Pong et al. .................... 711/148 |
| 2003/0097607 | A1 | * | 5/2003 | Bessire .......................... 714/5 |
| 2006/0212668 | A1 | * | 9/2006 | Furukawa et al. ............ 711/162 |

FOREIGN PATENT DOCUMENTS

JP     05-100927 A    4/1993
JP     07-121308 A    5/1995

(Continued)

OTHER PUBLICATIONS

Japanese Office Action mailed Oct. 1, 2013 for corresponding Japanese Application No. 2010-024147, with Partial English-language Translation.

*Primary Examiner* — Michael Krofcheck
(74) *Attorney, Agent, or Firm* — Fujitsu Patent Center

(57) ABSTRACT

A save control section included in a storage apparatus continuously performs writeback by which a data group is read out from a plurality of storage sections of the storage apparatus and by which the data group is saved in a data group storage section of the storage apparatus, or staging by which a data group saved in the data group storage section is distributed and stored in the plurality of storage sections according to storage areas of the data group storage section which store a plurality of data groups. An output section of the storage apparatus outputs in block a data group including the data stored in each of the plurality of storage sections. The data group storage section has the storage areas for storing a data group.

12 Claims, 31 Drawing Sheets

(56) References Cited

FOREIGN PATENT DOCUMENTS

| | | |
|---|---|---|
| JP | 2000-357059 A | 12/2000 |
| JP | 2001-100939 A | 4/2001 |
| JP | 2006-113881 A | 4/2006 |
| JP | 2006-185000 A | 7/2006 |
| JP | 2006-260292 A | 9/2006 |
| JP | 2006-268420 A | 10/2006 |
| JP | 2008-181288 A | 8/2008 |
| WO | WO-2008/152691 | 12/2008 |

* cited by examiner

BUFFER MANAGEMENT TABLE 1123a

| TARGET BUFFER SET ID | WRITEBACK POINTER INFORMATION | STAGING POINTER INFORMATION |
|---|---|---|
| 9006 | GENERATION 25 | GENERATION 12 |
| ⋮ | ⋮ | ⋮ |

FIG. 4

BUFFER SET MANAGEMENT TABLE 1124a

| BUFFER SET ID | USE | TARGET GENERATION | STORED I/O AMOUNT |
|---|---|---|---|
| 9000 | STAGING | GENERATION 11 | 1000 |
| 9001 | STAGING | GENERATION 12 | 1000 |
| 9002 | STAGING | GENERATION 13 | 1000 |
| 9003 | STAGING | GENERATION 14 | 800 |
| 9004 | WRITEBACK | GENERATION 21 | 600 |
| 9005 | WRITEBACK | GENERATION 22 | 400 |
| 9006 | WRITEBACK | GENERATION 23 | 100 |
| 9007 | — | — | — |

FIG. 5

SAVE BUFFER MANAGEMENT TABLE 1125a

| MAXIMUM NUMBER OF GENERATIONS | SAVE POSITION | |
|---|---|---|
| | CONTROL MODULE | LEADING ADDRESS |
| 10000 | #00 | 0x00000 |
| | #01 | 0x10000 |
| | #02 | 0x20000 |
| ⋮ | ⋮ | ⋮ |

FIG. 6

I/O MONITORING TABLE 1126a

| LUN | LBA | AMOUNT OF I/O | TIME ELAPSED (SECOND) | MONITORING TIME (SECOND) |
|---|---|---|---|---|
| 5 | 500 | 10 | 12 | 15 |
| 3 | 350 | 50 | 11 | 15 |
| 2 | 10 | 30 | 4 | 15 |
| 3 | 370 | 30 | 4 | 15 |

FIG. 7

PLURAL GENERATION ACCESS MANAGEMENT TABLE 1127a

| GENERATION | I/O CHARGED AMOUNT | PREDICTED FREEING WAIT TIME (SECONDS) [SINGLE GENERATION] | PREDICTED FREEING WAIT TIME (SECONDS) [PLURAL GENERATIONS] |
|---|---|---|---|
| 20 | 400 | 2 | 2 |
| 21 | 900 | 5 | 6 |
| 22 | 30 | 1 | 6 |
| 23 | 230 | 2 | 7 |

FIG. 8

LINE MANAGEMENT TABLE 1128a

| LINE NUMBER | CONNECTED ENCLOSURE | ORDER GUARANTEE | LINE USAGE (%) | NUMBER OF PROCESSABLE GENERATIONS |
|---|---|---|---|---|
| 1 | ENCLOSURE A | INVALID | 20 | — |
| 2 | ENCLOSURE B | VALID | 50 | 5 |
| 3 | ENCLOSURE C | INVALID | 95 | — |
| 4 | ENCLOSURE D | INVALID | 0 | — |

FIG. 9

BUFFER STATE MANAGEMENT TABLE 1129a

| CONTROL MODULE | CONTROL MODULE STATE | STAGING GENERATION | BUFFER STATE |
|---|---|---|---|
| #00 | USABLE | 10, 11, 12, 13 | PROCESSED |
| #01 | UNUSABLE | 10, 11, 12, 13 | NOT YET PROCESSED |

FIG. 10

STORAGE APPARATUS AND STORAGE APPARATUS CONTROL METHOD

CROSS-REFERENCE TO RELATED APPLICATION

This application is based upon and claims the benefit of priority of the prior Japanese Patent Application No. 2010-024147, filed on Feb. 5, 2010, the entire contents of which are incorporated herein by reference.

FIELD

The embodiments discussed herein are related to a storage apparatus, a storage apparatus control program, and a storage apparatus control method.

BACKGROUND

In order to improve performance or reliability, a redundant structure including a plurality of control modules for controlling inputting data to and outputting data from a storage device which is a storage medium such as a hard disk drive is adopted in conventional storage systems including distributed cache memory type storage apparatus. Each control module performs the process of reading data from and writing data to a logical volume.

In preparation for the occurrence of an unexpected disaster or the like, some of these storage apparatus have a REC (Remote Equivalent Copy) function for transferring data in a logical volume to a remote place via a network and performing remote copy. With an ordinary REC function, however, order is not guaranteed at the time of transferring data. Therefore, it may take a lot of time to recover the data after the occurrence of a disaster. In order to solve this problem, some storage systems have, for example, a REC consistency mode as a remote copy function which guarantees the order of remote copy.

In the REC consistency mode, a storage apparatus stores data sent from a host computer in a buffer of a control module which is a dedicated memory referred to as a consistency buffer and which is divided into constant-size storage areas according to generation. The storage apparatus then transfers the data to a storage apparatus which is a copy destination via a network according to generation. The storage apparatus to which the data is transferred stores the data in a logical volume so that the order of the data will be maintained. By doing so, the order of the remote copy is guaranteed.

FIGS. 30 and 31 illustrate a storage system having a remote copy function which guarantees order. In a storage system illustrated in FIG. 30, a storage apparatus 3100 including control modules #00 and #01 and a storage apparatus 3200 including control modules #10 and #11 are connected via a network 3011. It is assumed that remote copy is performed via the network 3011 with the storage apparatus 3100 and 3200 as a copy source and a copy destination respectively.

The storage apparatus 3100 has the control module #00 including a record only buffer 31180 including a buffer 31180a associated with a storage device 31170 and a BIT (Buffer Index Table) storage section 31180b, a buffer set information storage section 31190 which stores information regarding a buffer set, and the storage device 31170 which stores data and the control module #01 including a record only buffer 31181 including a buffer 31181a associated with a storage device 31171 and a BIT storage section 31181b, a buffer set information storage section 31191, and the storage device 31171.

Similarly, the storage apparatus 3200 has the control module #10 including a record only buffer 32180 including a buffer 32180a associated with a storage device 32170 and a BIT storage section 32180b, a buffer set information storage section 32190, and the storage device 32170 and the control module #11 including a record only buffer 32181 including a buffer 32181a associated with a storage device 32171 and a BIT storage section 32181b, a buffer set information storage section 32191, and the storage device 32171.

Each of the buffers 31180a, 31181a, 32180a, and 32181a is divided into a plurality of constant-size storage areas. A buffer ID is assigned to each of the storage areas obtained by dividing the buffers 31180a, 31181a, 32180a, and 32181a. Data which has already been stored in the corresponding storage devices 31170, 31171, 32170, and 32171 or data which is to be stored in the corresponding storage devices 31170, 31171, 32170, and 32171 is stored temporarily in the storage areas of the buffers 31180a, 31181a, 32180a, and 32181a. In addition, the BIT storage sections 31180b, 31181b, 32180b, and 32181b store BITs which are information including storage locations on the storage devices 31170, 31171, 32170, and 32171 where the data stored in the corresponding buffers 31180a, 31181a, 32180a, and 32181a is stored, buffer IDs, and the like.

In FIG. 30, "(0000)" indicated in the buffer 31180a represents buffer data stored in a storage area the buffer ID of which is "0000." "0000" indicated in the BIT represents a buffer ID of a storage area corresponding to the BIT.

Each of the buffer set information storage sections 31190, 31191, 32190, and 32191 stores information regarding a buffer set which is a combination of buffer data stored in storage areas of buffers included in control modules. For example, information regarding a buffer set which is a combination of the buffer data (0000) and the buffer data (0100) enclosed with a dotted line in the horizontal direction in the storage apparatus 3100 (copy source) is stored.

Information regarding a buffer set includes information for associating buffer data stored in a storage area of a buffer of a control module corresponding to a buffer set information storage section with a storage area of a buffer of the storage apparatus 3200 (copy destination) which stores the buffer data. For example, the buffer data (0000) stored in the storage area the buffer ID of which is "0000" is associated with a storage area the buffer ID of which is "1000" and to which the buffer data (0000) is copied in the buffer set information storage section 31190 of the control module #00.

When the control modules #00 and #01 of the storage apparatus 3100 in the above storage system accept a write I/O instruction (instruction to write received data to a storage device) from, for example, a host computer, the control modules #00 and #01 store the data in the storage devices 31170 and 31171, respectively, in accordance with the write I/O instruction. In addition, the control modules #00 and #01 store the data in the buffers. At this time the data is managed by the buffer set. That is to say, pieces of buffer data are associated with each other by buffer set information and make up a buffer set. When the control modules #00 and #01 complete writing the data to the buffers, the control modules #00 and #01 begin to transfer the data to the storage apparatus 3200 by the buffer set, that is to say, to perform remote copy.

The data transferred from the storage apparatus 3100 (copy source) to the storage apparatus 3200 by the remote copy is stored in the buffers included in the control modules #10 and #11 of the storage apparatus 3200 (copy destination) in accordance with the buffer set information. The control modules #10 and #11 then write the data stored in the buffers to the storage devices 32170 and 32171 respectively. When this process is completed, each control module included in the storage apparatus 3100 and 3200 frees a buffer and the like.

As has been described, data is sent in block by the use of the record only buffers and a buffer set is controlled in block. In the storage apparatus 3200 (copy destination) the data is written to the storage devices 32170 and 32171 by the buffer set. By doing so, the order of the data transferred is guaranteed.

Japanese Laid-open Patent Publication No. 2001-100939
Japanese Laid-open Patent Publication No. 07-121308
Japanese Laid-open Patent Publication No. 05-100927
Japanese Laid-open Patent Publication No. 2006-260292
International Publication Pamphlet No. WO/2008/152691

As illustrated in FIG. 31, however, the buffers and the BITs in the storage apparatus 3100 (copy source) which store data that has been transferred wait for freeing until the data is expanded in the storage devices of the storage apparatus 3200 (copy destination). The data is held in the storage apparatus 3100 (copy source).

It is assumed that there is a delay in the process of expanding the data in the storage devices because of a heavy update load on a logical volume of the storage apparatus 3200 or that an abnormality has occurred in the network 3011 between the storage apparatus 3100 and 3200. For example, if the line capability of the network 3011 is poor or is not uniform, then a delay occurs in a transfer process.

If a delay occurs in a transfer process from such a cause, time for which the buffers and the BITs in the storage apparatus 3100 and 3200 are used becomes longer and the buffers in the storage apparatus 3100 and 3200 cannot be freed.

It is assumed that the storage apparatus 3100 accepts new write I/O instructions from, for example, the host computer in this state. Each time the storage apparatus 3100 (copy source) accepts the write I/O instruction, the storage apparatus 3100 stores data to be written in the buffers. As a result, the buffers of the storage apparatus 3100 are used one after another.

If this state continues, it is impossible to ensure a buffer in the storage apparatus 3100 which can store data. As a result, the buffers are exhausted in the storage apparatus 3100. In addition, if data the size of which is larger than the set size of the buffers is processed, then the buffers are also exhausted in the storage apparatus 3100.

In a state in which the buffers are exhausted, the storage apparatus 3100 does not execute a write I/O instruction from, for example, the host computer and is in a stopped state. The storage apparatus 3100 cannot continue this state for a long time.

Accordingly, a buffer halt process is performed. That is to say, the execution of the write I/O instruction is stopped temporarily. If the state in which the buffers are exhausted is not canceled after the elapse of a certain period of time, then the execution is stopped temporarily and contents stored in the buffers are erased. The storage apparatus 3100 and 3200 perform the buffer halt process to clear the buffers. In addition, the storage apparatus 3100 and 3200 resume the execution of the write I/O instruction.

At this time the storage apparatus 3100 writes back information, such as data, in the buffers to a dedicated bit map. After the storage apparatus 3100 performs the buffer halt process, the storage apparatus 3100 performs remote copy transfer which does not guarantee order in accordance with the bit map. In this case, remote copy which guarantees order is stopped.

A storage system having a REC disk buffered consistency mode will now be discussed. With the above remote copy function which guarantees order, data transferred by remote copy is stored temporarily in a save buffer, such as a hard disk drive, in the REC disk buffered consistency mode. By utilizing this mode, order can be guaranteed at remote copy time, for example, even if an update load on a logical volume of a storage apparatus is heavy or an abnormality has occurred in transfer via a network between storage apparatus. It is assumed that, in this storage system, data is stored in a save buffer according to generation.

In this storage system, a buffer included in each control module is used for writeback and staging. The writeback is the operation of reading out data from a buffer and writing the data to a save buffer. The staging is the operation of reading out data from a save buffer and writing the data to a buffer. With the writeback and the staging, access to a save buffer is performed in prescribed order in order to guarantee the order of data. For example, with the writeback and the staging, access to a save buffer is performed in order of generation. However, if access to a save buffer is performed according to generation in accordance with the order, areas of the save buffer which are not consecutive may be accessed by the writeback. This may make it impossible to realize the original performance of the save buffer. As a result, a delay in the writeback leads to a delay in storing data in buffers and the order may not be guaranteed adequately.

SUMMARY

According to an aspect of the present invention, a storage apparatus having a plurality of storage sections in which data is distributed and stored and an output section which outputs in block a data group including data stored in each of the plurality of storage sections includes a data group storage section which has storage areas for storing the data group and a save control section which continuously performs at least one of writeback by which the data group is read out from the plurality of storage sections and by which the data group is saved in the data group storage section and staging by which a data group saved in the data group storage section is distributed and stored in the plurality of storage sections according to storage areas of the data group storage section which store a plurality of data groups that are objects of the writeback or the staging.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates a buffer management table in the storage system according to the second embodiment;

FIG. 5 illustrates a buffer set management table in the storage system according to the second embodiment;

FIG. 6 illustrates a save buffer management table in the storage system according to the second embodiment;

FIG. 7 illustrates an I/O monitoring table in the storage system according to the second embodiment;

FIG. 8 illustrates a plural generation access management table in the storage system according to the second embodiment;

FIG. 9 illustrates a line management table in the storage system according to the second embodiment;

FIG. 10 illustrates a buffer state management table in the storage system according to the second embodiment;

DESCRIPTION OF EMBODIMENTS

Figure 1:
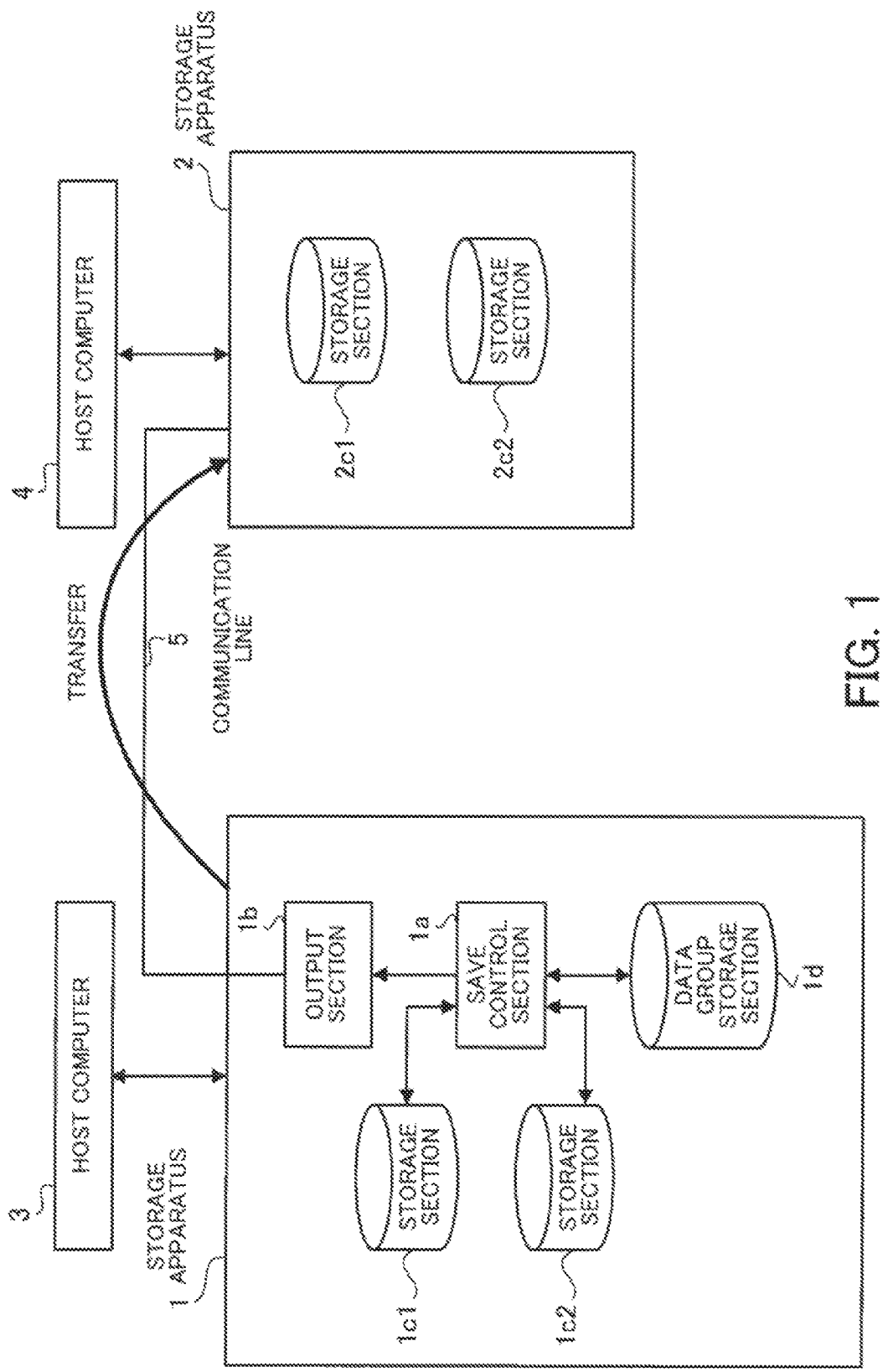
FIG. 1 illustrates a storage apparatus according to a first embodiment.

Embodiments of the present invention will now be described with reference to the accompanying drawings, wherein like reference numerals refer to like elements throughout.

First Embodiment

FIG. 1 illustrates a storage apparatus according to a first embodiment. A storage apparatus 1 according to the first embodiment is connected to a storage apparatus 2 by a communication line 5. The storage apparatus 1 is connected to a host computer 3. The storage apparatus 2 is connected to a host computer 4. The storage apparatus 1 performs remote copy by transferring data transmitted from the host computer 3 to the storage apparatus 2 via the communication line 5. The storage apparatus 1 includes a save control section 1a, an output section 1b, storage sections 1c1 and 1c2, and a data group storage section 1d. The storage apparatus 2 includes storage sections 2c1 and 2c2.

The save control section 1a performs writeback and staging. When the save control section 1a performs writeback, the save control section 1a reads out data groups associated with each other from the storage sections 1c1 and 1c2 and saves the data groups in the data group storage section 1d according to the order in which storage areas of the data group storage section 1d in which the data groups are to be stored are arranged. When the save control section 1a performs staging, the save control section 1a distributes and stores data groups saved in the data group storage section 1d in the storage sections 1c1 and 1c2 according to the order in which storage areas of the data group storage section 1d in which the data groups are stored are arranged. That is to say, when the save control section 1a saves data from the storage sections 1c1 and 1c2 to the data group storage section 1d, the save control section 1a continuously accesses, wherever practicable, pieces of data which are to be saved in the data group storage section 1d next to one another. When the save control section 1a stores data saved in the data group storage section 1d in the storage sections 1c1 and 1c2, the save control section 1a continuously accesses, wherever practicable, pieces of data which are saved in the data group storage section 1d next to one another. By doing so, consecutive areas of the data group storage section 1d are accessed at writeback time and staging time. As a result, seek time can be reduced and the efficiency of access to the data group storage section 1d can be increased.

The output section 1b outputs a data group including data stored in the storage sections 1c1 and 1c2 to the storage apparatus 2 in block.

Data for remote copy transmitted from the host computer 3 is distributed and stored temporarily in the storage sections 1c1 and 1c2. For example, if the amount of data stored in the storage sections 1c1 and 1c2 increases, then the save control section 1a saves the data stored in the storage sections 1c1 and 1c2 to the data group storage section 1d in order to prevent the data from overflowing the storage sections 1c1 and 1c2.

The data group storage section 1d has areas for storing a data group. The data which the save control section 1a saves from the storage sections 1c1 and 1c2 is stored in storage areas of the data group storage section 1d. In addition, the save control section 1a reads out the data saved in storage areas of the data group storage section 1d and stores the data in the storage sections 1c1 and 1c2.

The data for remote copy transferred from the storage apparatus 1 via the communication line 5 is distributed and stored in the storage sections 2c1 and 2c2.

The storage apparatus 1 according to this embodiment includes the two storage sections. However, the number of storage sections included in the storage apparatus 1 is not limited to two. That is two say, the number of storage sections included in the storage apparatus 1 may be one or three or more. Furthermore, The storage apparatus 2 according to this embodiment includes the two storage sections. However, the number of storage sections included in the storage apparatus 2 is not limited to two. That is two say, the number of storage sections included in the storage apparatus 2 may be one or three or more.

With the storage apparatus 1, as has been described, the save control section 1a gains access in order in which storage areas of the data group storage section 1d are arranged. By doing so, seek time for access to the data group storage section 1d is reduced. As a result, throughput is enhanced and a decrease in the efficiency of the function of guaranteeing order in remote copy can be controlled.

Second Embodiment

An embodiment in which the storage apparatus 1 illustrated in FIG. 1 is applied to a storage apparatus 100 including storage groups which make up RAID (Redundant Arrays of Inexpensive Disks) will now be described as a second embodiment.

Figure 2:
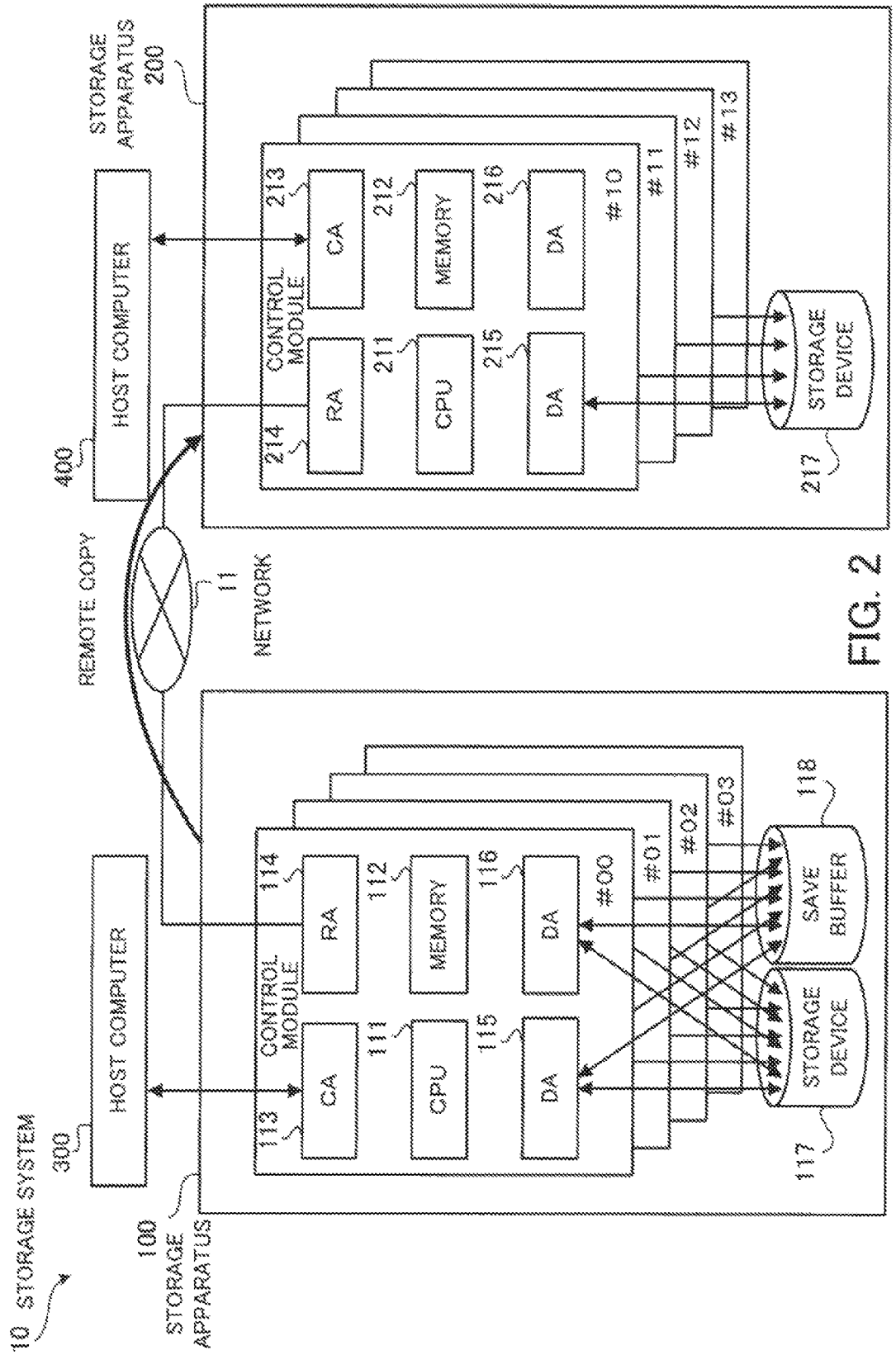
FIG. 2 illustrates a storage system according to a second embodiment.

FIG. 2 illustrates a storage system according to a second embodiment. A storage system 10 illustrated in FIG. 2 includes the storage apparatus 100 and a storage apparatus 200 connected to the storage apparatus 100 via a network 11. Communication can be performed between the storage apparatus 100 and 200.

The storage apparatus 100 is distributed cache memory type RAID and includes control modules #00, #01, #02, and #03 each having a memory used as a cache memory or the like, a storage device 117 which is a storage unit such as magnetic disk unit, and a save buffer 118.

The control modules #00, #01, #02, and #03 are connected to the storage device 117 and the save buffer 118. The control module #00 includes a CPU (Central Processing Unit) 111, a memory 112, a CA (Channel Adapter) 113, a RA (Remote Adapter) 114, and DAs (Device Adapters) 115 and 116.

The CPU 111 executes determined program instructions to make the control module #00 operate, and realizes remote copy which guarantees order.

The memory 112 is used as a cache memory. In addition, the memory 112 is used as a record only buffer 1121, a buffer set information storage section 11221, and the like described later in FIG. 3.

The CA 113 functions as an interface controller for a host computer 300 connected to the storage apparatus 100. The RA 114 functions as an interface controller for, for example, another storage apparatus, such as the storage apparatus 200, connected via the network 11.

The DAs 115 and 116 are interface controllers for the storage device 117 and the save buffer 118. In this embodiment the DAs 115 and 116 are connected to the storage device 117 and the save buffer 118.

The other control modules #01 through #03 included in the storage apparatus 100 and control modules #10 through #13 included in the storage apparatus 200 have the same function as the control module #00 has. The storage apparatus 200 illustrated in FIG. 2 does not include a save buffer. However, the storage apparatus 200 may include a save buffer.

In this embodiment the storage apparatus 100 and 200 include the four control modules #00 through #03 and the four control modules #10 through #13 respectively. However, the number of control modules included in the storage apparatus 100 and 200 is not limited to four. The storage apparatus 100 and 200 may include any number of control modules. In addition, it is necessary that the storage apparatus 100 and 200 should be distributed cache memory type RAID. However, the storage apparatus 100 and 200 may include any number of CPUs, CAs, RAs, and DAs.

Figure 3:
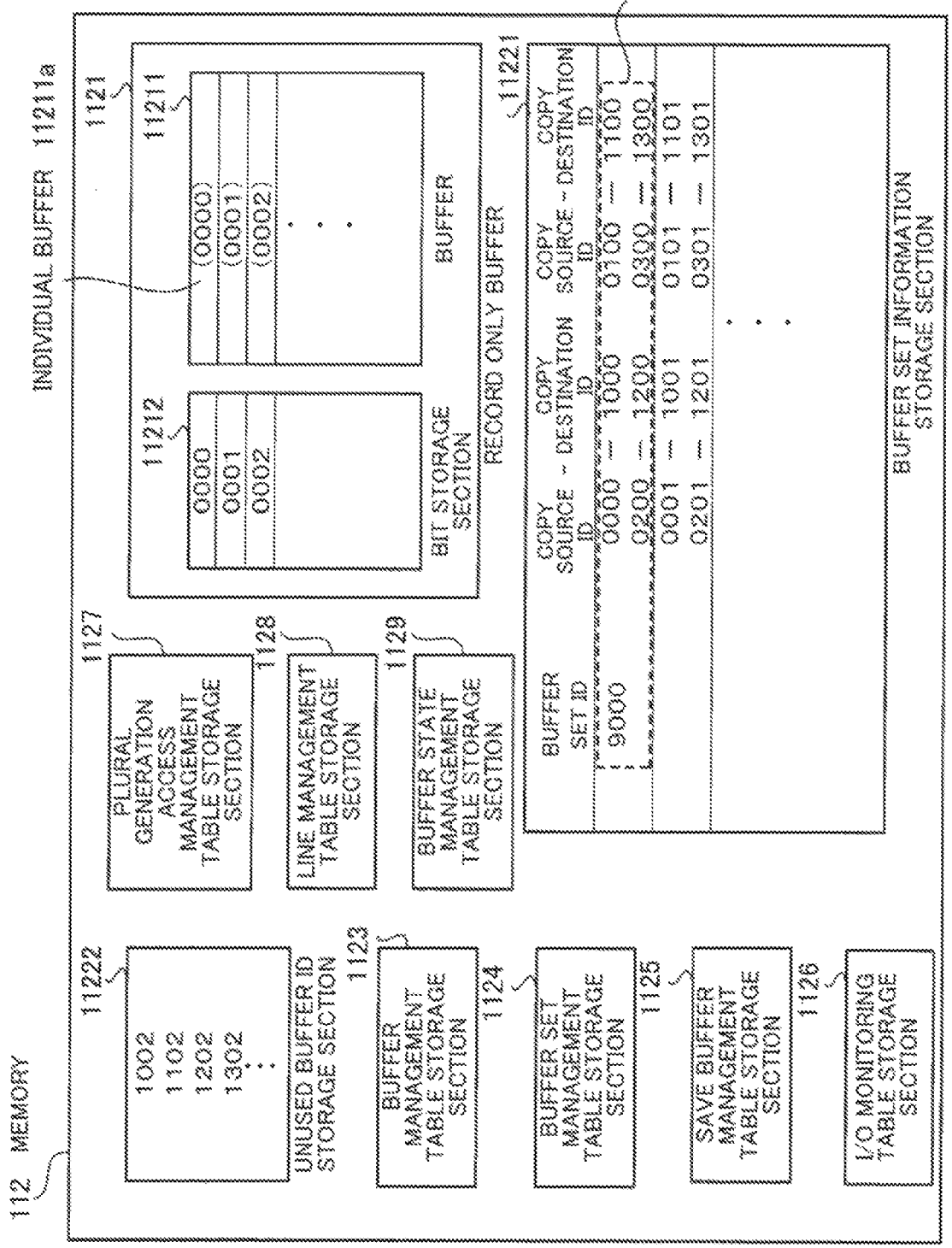
FIG. 3 illustrates an example of the structure of the memory included in the control module in the storage system according to the second embodiment.

FIG. 3 illustrates an example of the structure of the memory included in the control module in the storage system according to the second embodiment. The memory 112 illustrated in FIG. 3 includes the record only buffer 1121, the buffer set information storage section 11221, an unused buffer ID storage section 11222, a buffer management table storage section 1123, a buffer set management table storage section 1124, and a save buffer management table storage section 1125. In addition, the memory 112 includes an I/O monitoring table storage section 1126, a plural generation access management table storage section 1127, a line management table storage section 1128, and a buffer state management table storage section 1129.

The record only buffer 1121 includes a buffer 11211 and a BIT storage section 11212. The buffer 11211 temporarily stores data for remote copy which is to be transferred to, for example, the storage apparatus 200 and which is to be stored or has already been stored in the storage device 117 or the like. In this embodiment the buffer 11211 is divided into 8 storage areas the size of which is constant. Unique identification information is assigned to each storage area of the buffer 11211. In this embodiment description will be given with the case where the buffer 11211 is divided into 8 storage areas as an example. However, the number of storage areas into which the buffer 11211 is divided is not limited to eight. The buffer 11211 may be divided into any number of storage areas.

Hereinafter each of the storage areas into which the buffer 11211 is divided will be referred to as an "individual buffer." Identification information assigned to an individual buffer will be referred to as a "buffer ID." Data stored in any individual buffer will be referred to as "buffer data."

For example, (0000), (0001), (0002), and so on are indicated in the buffer 11211 illustrated in FIG. 3. The numbers "0000," "0001," "0002," and so on in the parentheses represent buffer IDs assigned to the individual buffers. (0000), (0001), (0002), and so on indicated in the buffer 11211 represent buffer data stored in the individual buffers indicated by the buffer IDs in the parentheses.

The BIT storage section 11212 stores a BIT including a LU (Logical Unit) or a LBA (Logical Block Address) where buffer data stored in each individual buffer in the buffer 11211 is expanded, data size, a copy session number, and the like.

"0000," "0001," "0002," and so on indicated in the BIT storage section 11212 illustrated in FIG. 3 represent the buffer IDs assigned to the individual buffers in the buffer 11211. For example, an area in the BIT storage section 11212 corresponding to "0000" stores a BIT including a LU or a LBA where buffer data stored in the individual buffer the buffer ID of which is "0000" is expanded, data size, a copy session number, and the like.

The buffer set information storage section 11221 stores identification information, or a buffer set ID, indicative of a combination (buffer set) of individual buffers in control modules in the same storage apparatus which is to be used for writeback or staging.

Hereinafter information regarding a buffer set will be referred to as "buffer set information." Furthermore, buffer data stored in a buffer set will be referred to as "buffer set data" in general.

In this embodiment a buffer in each control module includes 8 individual buffers, so each control module includes 8 buffer sets.

Buffer set information includes information for associating an individual buffer included in a control module of the storage apparatus 100 with an individual buffer included in a control module of the storage apparatus 200 (copy destination) in the case of performing remote copy between the storage apparatus 100 and 200. The process of incorporating information for associating an individual buffer with another individual buffer into buffer set information is referred to as a "matching process."

Hereinafter the buffer ID of an individual buffer included in a control module of the storage apparatus 100 (copy source) will be referred to as a "copy source ID." Similarly, the buffer ID of an individual buffer included in a control module of the storage apparatus 200 (copy destination) will be referred to as a "copy destination ID."

It is assumed that the buffer IDs (copy source IDs) "0000," "0100," "0200," and "0300" stored in the buffer set information storage section 11221 illustrated in FIG. 3 indicate individual buffers included in the control modules #00, #01, #02, and #03, respectively, of the storage apparatus 100. For example, the buffer ID "0000" indicates an individual buffer 11211a. In addition, it is assumed that the buffer IDs (copy destination IDs) "1000," "1100," "1200," and "1300" stored in the buffer set information storage section 11221 illustrated in FIG. 3 indicate individual buffers included in the control modules #10, #11, #12, and #13, respectively, of the storage apparatus 200.

The storage apparatus 100 is distributed cache memory type RAID and distributes and stores data in individual buffers (individual buffers in FIG. 3 the buffer IDs of which are "0000," "0100," "0200," and "0300," for example) included in the control modules. In this case, buffer set information 11221a indicative of buffer sets including the individual buffers the buffer IDs of which are "0000," "0100," "0200," and "0300" is stored in the buffer set information storage section 11221. Buffer set information includes combination information which indicates that a copy source ID and a copy destination ID are combined. For example, the buffer set information 11221a includes combination information which indicates that "0000" and "1000" are combined, that "0100" and "1100" are combined, that "0200" and "1200" are combined, and that "0300" and "1300" are combined.

In this embodiment remote copy is performed by the buffer set. Data to be copied by the buffer set includes a BIT and buffer data stored in the record only buffer 1121 and buffer set information stored in the buffer set information storage section 11221. In this embodiment data to be copied by the buffer set is managed as one "generation." The details of a "generation" will be described later in FIG. 12.

The unused buffer ID storage section 11222 stores the buffer ID of an unused individual buffer included in the storage apparatus 200 (copy destination). Hereinafter the buffer ID of an unused individual buffer will be referred to as an "unused buffer ID." For example, when the storage apparatus 100 is informed by the storage apparatus 200 (copy destination) of an unused buffer ID, the storage apparatus 100 stores the unused buffer ID in the unused buffer ID storage section 11222.

The buffer management table storage section 1123 stores a buffer management table used for managing the record only buffer 1121 and the like. A buffer management table will be described later in FIG. 4.

The buffer set management table storage section 1124 stores a buffer set management table used for managing a state in which a buffer set is used. A buffer set management table will be described later in FIG. 5.

The save buffer management table storage section 1125 stores a save buffer management table used for managing the save buffer 118. A save buffer management table will be described later in FIG. 6.

When remote copy is performed in this embodiment, the storage apparatus 100 performs the process of storing data in the record only buffer 1121, the process of transferring the data to the storage apparatus 200, and the like in block by the buffer set. Similarly, the storage apparatus 200 performs the process of, for example, expanding the data transferred from the storage apparatus 100 in a storage device 217 in block by the buffer set. The storage apparatus 200 (copy destination) expands the data transferred because of the remote copy in the storage device 217 by the buffer set. After the storage apparatus 200 has expanded the data in the storage device 217, the storage apparatus 100 and 200 free the buffers and the like. Accordingly, the remote copy which guarantees order is realized.

A memory included in each of the control modules #01 through #03 of the storage apparatus 100 and the control modules #10 through #13 of the storage apparatus 200 may have the same structure as the memory 112 has.

FIG. 4 illustrates a buffer management table in the storage system according to the second embodiment. A buffer management table 1123a includes Target Buffer Set ID, Writeback Pointer Information, and Staging Pointer Information columns.

Information indicative of the buffer set ID of a buffer set currently used for staging or writeback is set in the Target Buffer Set ID column. Information indicative of a generation which is an object of writeback is set in the Writeback Pointer Information column. Information indicative of the last generation for which staging is performed is set in the Staging Pointer Information column.

FIG. 5 illustrates a buffer set management table in the storage system according to the second embodiment. A buffer set management table 1124a includes Buffer Set ID, Use, Target Generation, and Stored I/O Amount columns.

A use for a buffer set indicated by a buffer set ID is set in advance in the Use column. For example, if a buffer set is used for staging, then "staging" is set in the Use column. If a buffer set is used for writeback, then "writeback" is set in the Use column.

A generation which is an object of a process set in the Use column is set in the Target Generation column. The amount of data which is stored in a buffer set and which is an object of an input-output process is set in the Stored I/O Amount column. For example, each time data is stored in a buffer set, the storage apparatus 100 updates the Target Generation column and the Stored I/O Amount column. "-" indicated in FIG. 5 corresponds to the case where "unused" is set.

FIG. 6 illustrates a save buffer management table in the storage system according to the second embodiment. A save buffer management table 1125a includes Maximum Number of Generations and Save Position columns. The maximum number of generations of data to be copied which can be stored in the save buffer 118 is set in the Maximum Number of Generations column. A leading address of a storage area in the save buffer 118 assigned to each control module is defined in the Save Position column.

Figure 11:
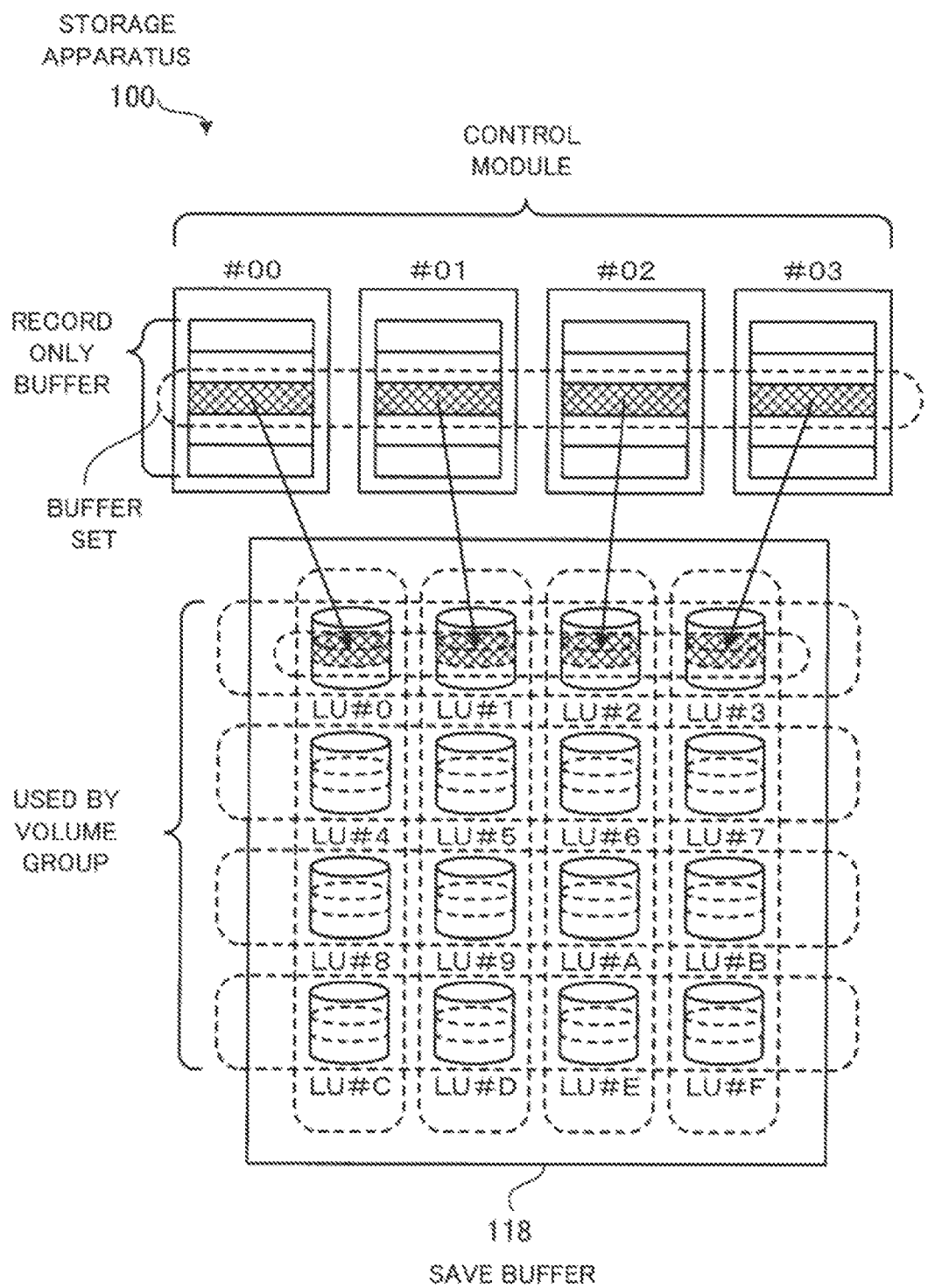
FIG. 11 illustrates the relationship between a memory and a save buffer in the storage system according to the second embodiment.

The maximum number of generations is determined at the time of, for example, initializing the save buffer 118. Hereinafter a storage area in the save buffer 118 which is assigned to each control module and which corresponds to one generation will be referred to as an "individual save buffer." For example, each of three storage areas into which a LU #0 described later in FIG. 11 is divided is an individual save buffer.

FIG. 7 illustrates an I/O monitoring table in the storage system according to the second embodiment. An I/O monitoring table 1126a includes LUN (Logical Unit Number), LBA (Logical Block Address), I/O Amount, Time Elapsed, and Monitoring Time columns.

Information indicative of a LU for which a write I/O instruction (instruction to write received data to a storage device) is issued is set in the LUN column. Information indicative of a leading LB to which the received data is written in the process of writing the received data is set in the LBA column. Information which indicates the amount of write I/O (amount of data to be written by the write I/O instruction) by the number of blocks is set in the Amount of I/O column. Information which indicates, in seconds, wait time for the freeing of a buffer from the time when a writeback request is made is set in the Time Elapsed column. Information which indicates, in seconds, the upper limit of a period from the time when a writeback request is made to the time when guaranteeing order is relinquished and when remote copy transfer which does not guarantee order is performed is set in the Monitoring Time column.

FIG. 8 illustrates a plural generation access management table in the storage system according to the second embodiment. A plural generation access management table 1127a includes Generation, I/O Charged Amount, Predicted Freeing Wait Time (Single Generation), and Predicted Freeing Wait Time (Plural Generations) columns.

Figure 24:
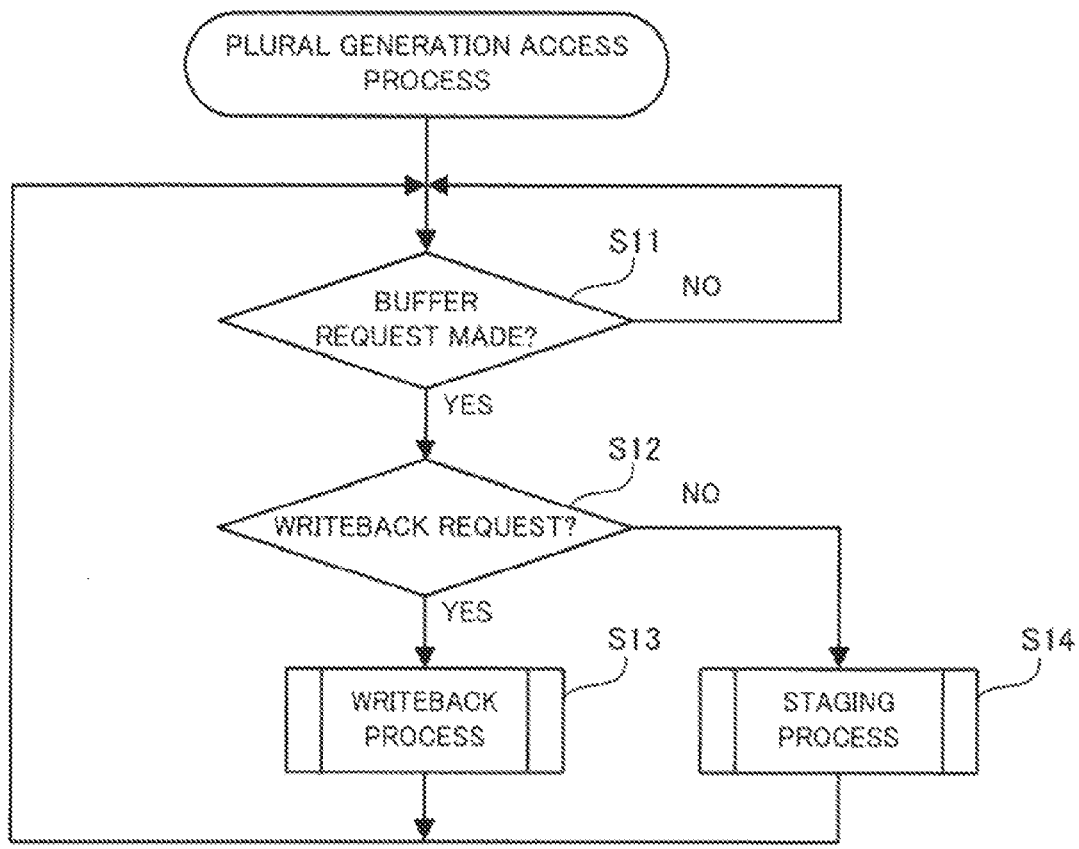
FIG. 24 is a flow chart of a procedure for a plural generation access process in the storage system according to the second embodiment.

Information indicative of the generation number of data which is an object of writeback is set in the Generation column. Information indicative of the total of the amount of blocks which are to be transferred by remote copy from the storage apparatus 100 to the storage apparatus 200, which are objects of a write I/O instruction, to which the same generation is assigned, and which are stored in a buffer (buffer 11211, for example) included in each control module of the storage apparatus 100 is set in the I/O Charged Amount column. Information which indicates, in seconds, predicted freeing wait time obtained by predicting time from the time when a writeback request is made to the time when writeback is completed and when a memory is freed in the case of transferring each generation individually for remote copy is set in the Predicted Freeing Wait Time (Single Generation) column. Information which indicates, in seconds, the total value of predicted memory freeing wait time for the first generation to the last generation in the case of transferring plural generations in block for remote copy in a plural generation access process described later in FIG. 24 is set in the Predicted Freeing Wait Time (Plural Generations) column.

If writeback is performed according to generation, time from time when a writeback request is made to the time when the writeback of a generation is completed changes according to the I/O charged amount of the generation. That is to say, the amount of data which is an object of writeback increases with an increase in an I/O charged amount, so time from time when a writeback request is made to the time when a memory is freed becomes longer. It is conceivable that there will be a correlation between predicted freeing wait time (single generation) and the I/O charged amount of a generation. Accordingly, by, for example, multiplying the I/O charged amount of a generation by a determined coefficient, predicted freeing wait time (single generation) can be calculated.

Predicted freeing wait time (plural generations) for a generation 21 indicates predicted time taken to complete the writeback of a generation 20 and the generation 21 in block in a plural generation access process. Similarly, predicted freeing wait time (plural generations) for a generation 22 indicates predicted time taken to complete the writeback of the generations 20, 21, and 22 in block in a plural generation access process. Predicted freeing wait time (plural generations) for a generation 23 indicates predicted time taken to complete the writeback of the generations 20 through 23 in block in a plural generation access process. The details of predicted freeing wait time (plural generations) will be described later in FIGS. 25 and 26.

FIG. 9 illustrates a line management table in the storage system according to the second embodiment. A line management table 1128a includes Line Number, Connected Enclosure, Order Guarantee, Line Usage, and Number of Processable Generations columns.

If the network 11 is, for example, a dedicated line, information indicative of an identification number for identifying a line which connects the storage apparatus 100 and a connected enclosure is set in the Line Number column. Information indicative of an identification sign for identifying an enclosure connected to the storage apparatus 100 by a line identified by a line number is set in the Connected Enclosure column.

As described later in FIG. 23, it is assumed that the storage apparatus 100 is connected to a host computer 300 via a network 13 and that the storage apparatus 100 is connected to connected enclosures, that is to say, to a storage apparatus 200a (enclosure A), a storage apparatus 200b (enclosure B), a storage apparatus 200c (enclosure C), and a storage apparatus 200d (enclosure D) via a network 11. In addition, it is assumed that the storage apparatus 200a through 200d are connected to a host computer 400 via a network 14.

Information indicative of whether order is guaranteed in remote copy transfer between the storage apparatus 100 and a connected enclosure is set in the Order Guarantee column. For example, if remote copy transfer which guarantees order can be performed between the storage apparatus 100 and a connected enclosure, then "valid" is set in the Order Guarantee column corresponding to the connected enclosure. On the other hand, if remote copy transfer which guarantees order cannot be performed between the storage apparatus 100 and a connected enclosure, then "invalid" is set in the Order Guarantee column corresponding to the connected enclosure. Information which indicates, in percentages, how a line which connects the storage apparatus 100 and a connected enclosure is used is set in the Line Usage column. If a line is congested and usage is high, then line usage is high. If a line is not congested and usage is low, then line usage is low. Information indicative of the maximum number of generations which can be accessed in the case of transferring plural generations in block for remote copy in the plural generation access process described later in FIG. 24 is set in the Number of Processable Generations column.

FIG. 10 illustrates a buffer state management table in the storage system according to the second embodiment. A buffer state management table 1129a includes Control Module, Control Module State, Staging Generation, and Buffer State columns.

Information for identifying the control modules #00 through #03 of the storage apparatus 100 is set in the Control Module column. Information indicative of whether a control module and a buffer included therein are in a usable or unusable state is set in the Control Module State column. If a control module and a buffer included therein are in a usable state, then "usable" is set in the Control Module State column. If a control module or a buffer included therein is in an unusable state, then "unusable" is set in the Control Module State column. Information indicative of a generation which is an object of staging by a control module is set in the Staging Generation column. Information indicative of whether no data is stored in a buffer (staging process has been completed for all of generations set in the Staging Generation column) or data which has not been processed yet is stored in the buffer is set in the Buffer State column. If a staging process has been completed and no data is stored in a buffer, then "processed" is set in the Buffer State column. If a staging process has not been completed and data which has not been processed yet is stored in the buffer, then "not yet processed" is set in the Buffer State column.

FIG. 11 illustrates the relationship between a memory and a save buffer in the storage system according to the second embodiment. A dotted line drawn across the control modules #00 through #03 indicates a buffer set corresponding to one generation. In the example illustrated in FIG. 11, the save buffer 118 includes one RAID group.

In this embodiment the RAID group used as the save buffer 118 of the storage apparatus 100 includes a plurality of (4, for example) storage devices. In addition, the RAID group used as the save buffer 118 includes logical units LU#0 through LU#F. The logical units LU#0 through LU#3, LU#4 through LU#7, LU#8 through LU#B, and LU#C through LU#F, which are enclosed with dotted lines in the horizontal direction, respectively form volume groups.

The RAID group used as the save buffer 118 is used by the volume group. In addition, determined logical units are assigned to a record only buffer included in each control module. With the save buffer 118 illustrated in FIG. 11, for example, the logical units LU#0, LU#4, LU#8, and LU#C are assigned to the record only buffer 1121 included in the control module #00. The logical units LU#1, LU#5, LU#9, and LU#D are assigned to the record only buffer included in the control module #01. Similarly, the logical units LU#2, LU#6, LU#A, and LU#E are assigned to the record only buffer included in the control module #02. The logical units LU#3, LU#7, LU#B, and LU#F are assigned to the record only buffer included in the control module #03. If the number of the logical units included in the save buffer 118 is greater than that of the control modules, then a plurality of logical units can be assigned in this way to one control module.

As described later in FIG. 12, each logical unit included in each volume group is divided by a size in which buffer data stored in an individual buffer, a BIT, and buffer set information are included. Each area obtained by the division is the above "individual save buffer." As indicated by each arrow of FIG. 11, for example, buffer data stored in an individual buffer in each control module, a BIT, and buffer set information are stored in an individual save buffer in a logical unit assigned to each control module in order of generation.

In this embodiment the save buffer 118 includes one RAID group. However, the save buffer 118 may include two or more RAID groups. In this case, the effect of distributing a load among the RAID groups is obtained.

Figure 12:
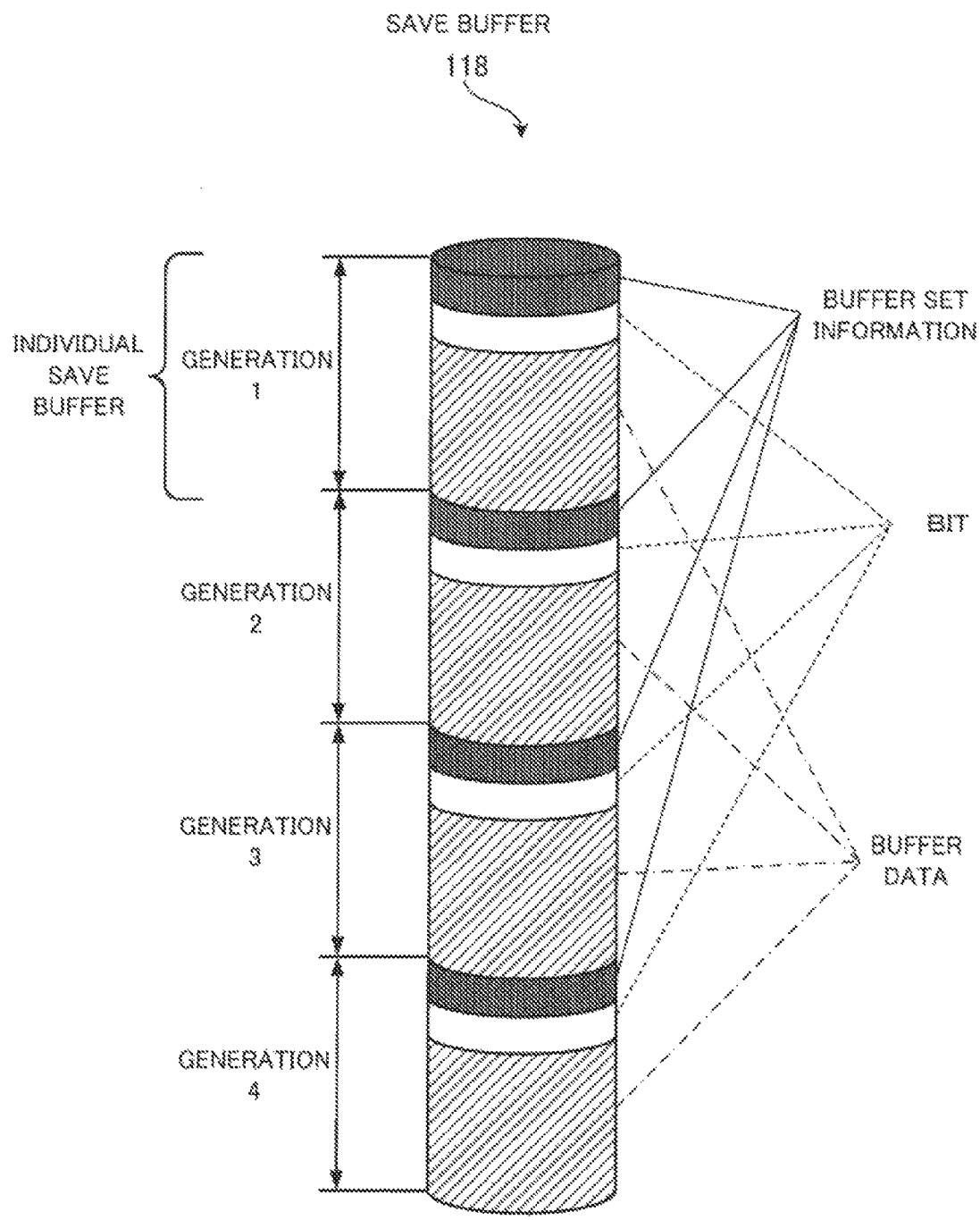
FIG. 12 illustrates the save buffer in the storage system according to the second embodiment.

FIG. 12 illustrates the save buffer in the storage system according to the second embodiment. With the save buffer 118 in this embodiment, as described above, the logical units LU #0 through LU#F illustrated in FIG. 11, for example, are divided into individual save buffers and are used. The size of each individual save buffer is set so that it will include buffer data stored in an individual buffer, a BIT, and buffer set information. Data to be copied corresponding to one generation, that is to say, buffer set information, a BIT, and buffer data are stored in each individual save buffer of the save buffer 118 according to and in order of generation. As illustrated in FIG. 12, for example, buffer set information, a BIT, and buffer data are stored in each individual save buffer of the save buffer 118 according to generation in the order of generations 1, 2, 3, and 4.

Figure 13:
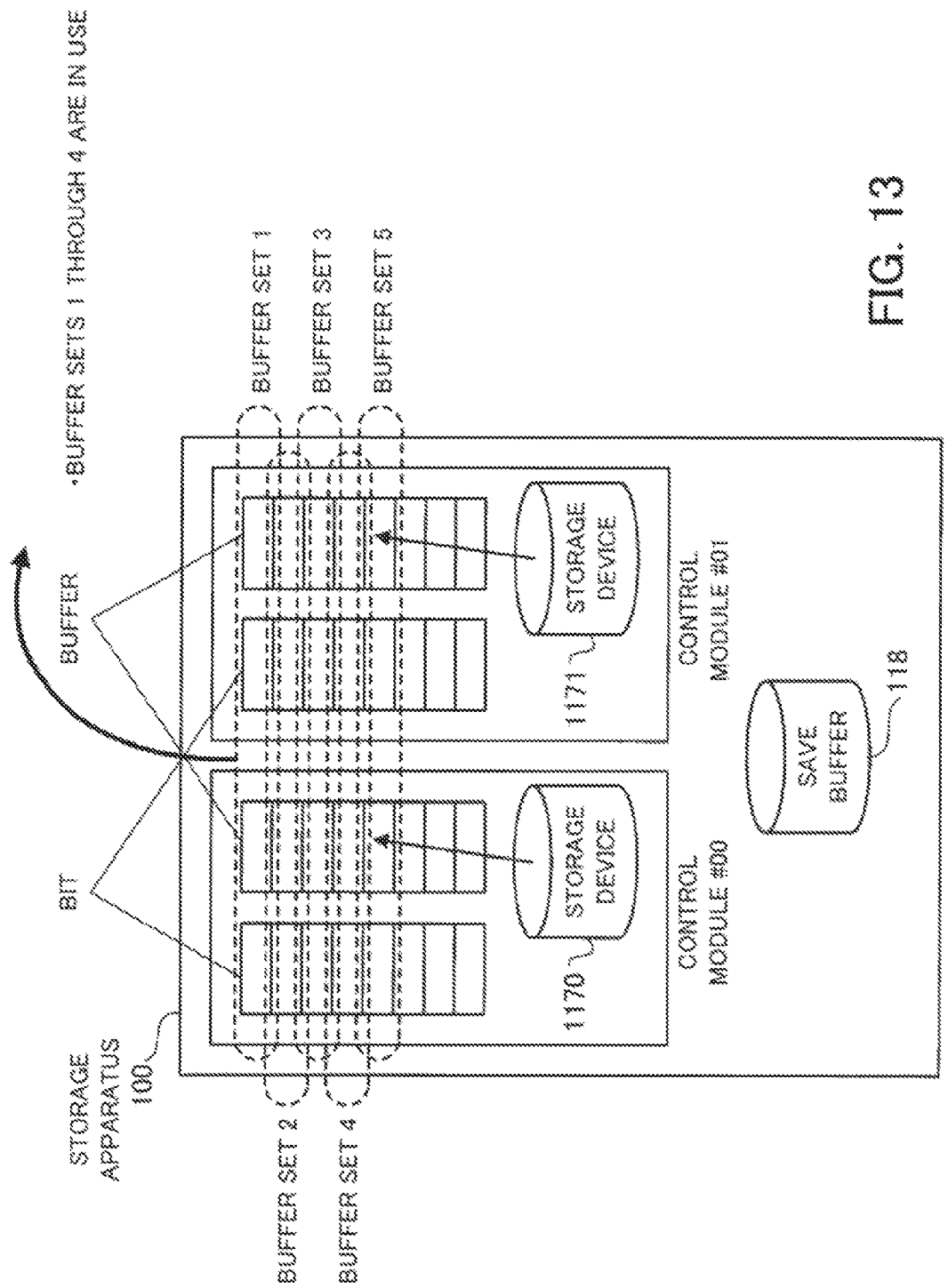
FIG. 13 illustrates data save in the storage system according to the second embodiment.
Figure 14:
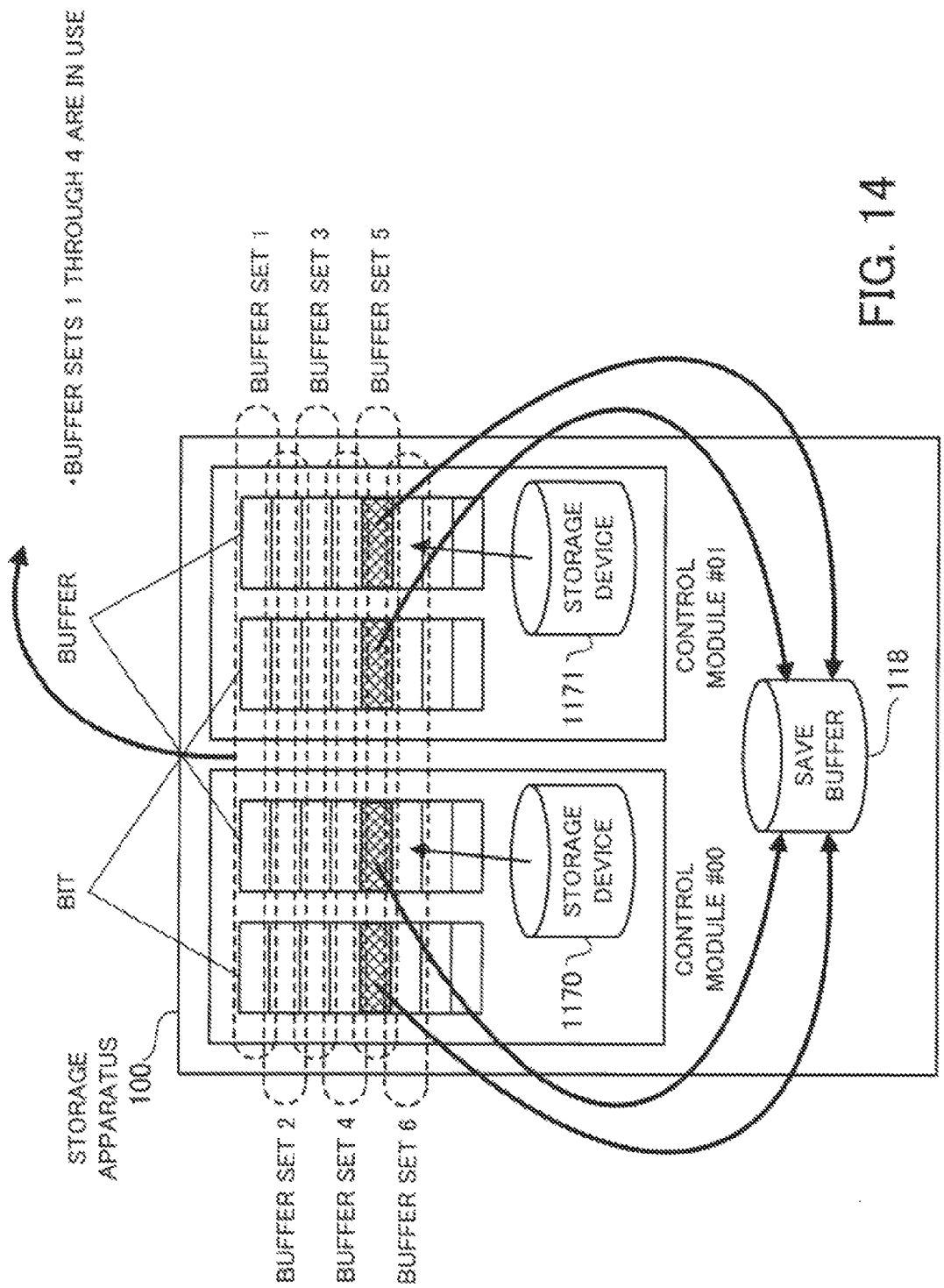
FIG. 14 illustrates the data save in the storage system according to the second embodiment.
Figure 15:
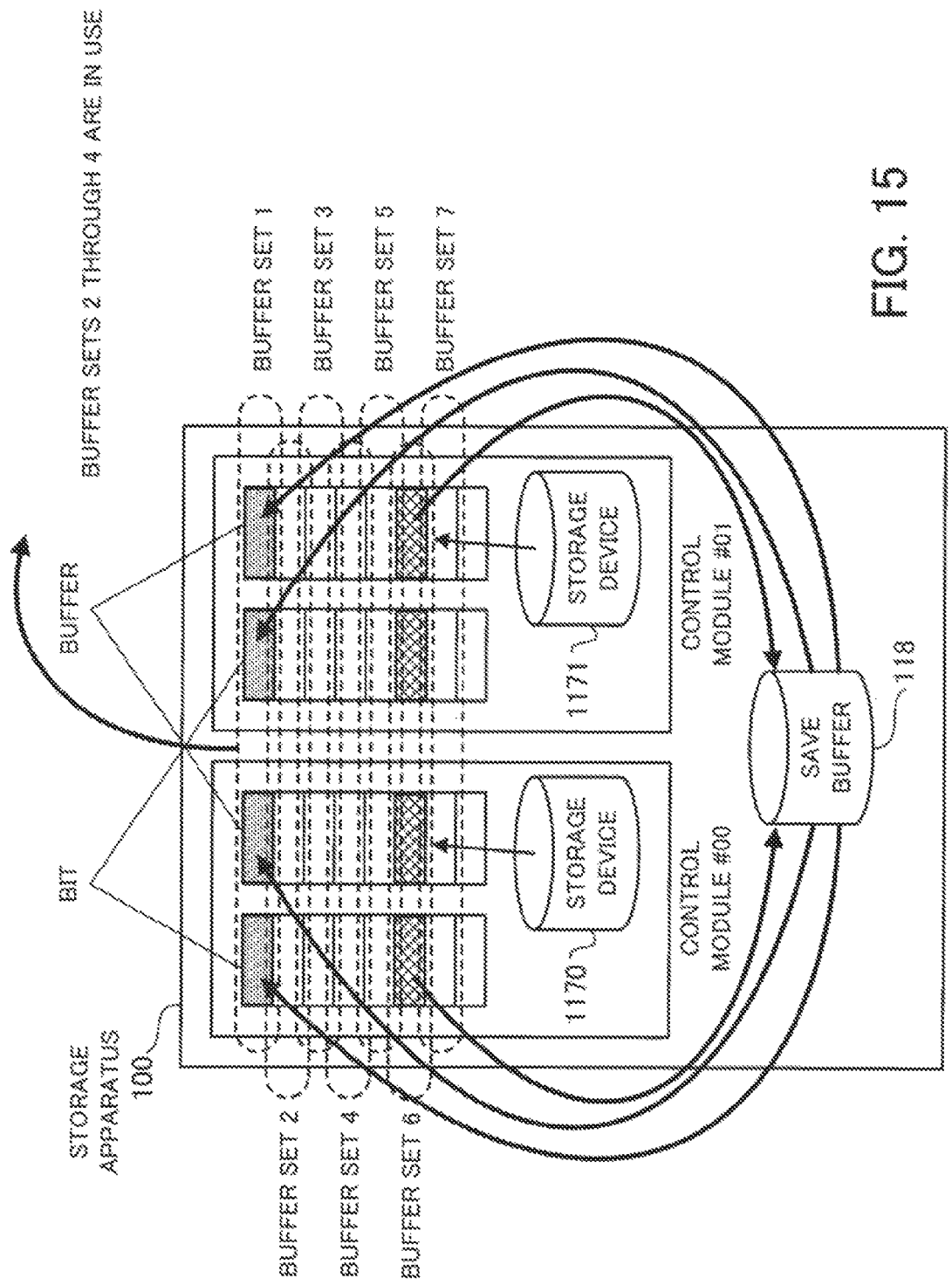
FIG. 15 illustrates the data save in the storage system according to the second embodiment.

FIGS. 13 through 15 illustrate data save in the storage system according to the second embodiment. FIG. 13 is a view for describing data save performed in the case of accepting a write I/O instruction in a state in which buffer sets 1 through 4 are in use in the storage apparatus 100 in the storage system according to this embodiment because of transfer being under way or a wait for an expansion process in the storage apparatus 200 (copy destination). Hereinafter it is assumed that buffer set data stored in the buffer sets 1 through 4 corresponds to generations 1, 2, 3, and 4 respectively.

When each control module (control module #00 or #01) of the storage apparatus 100 accepts a write I/O instruction sent from a host computer, it stores data corresponding to the write I/O instruction in its storage device (storage device 1170 or 1171) and stores a copy of the data in a buffer set 5 (FIG. 13). The buffer set data stored in the buffer set 5 corresponds to a generation 5.

FIG. 14 is a view for describing saving the data for which the write I/O instruction is accepted in a state in which the buffer sets 1 through 4 are in use in the storage apparatus 100 in the storage system according to this embodiment because of transfer being under way or a wait for an expansion process in the storage apparatus 200 (copy destination).

When the number of buffer sets which are in use becomes greater than the maximum number of buffer sets which can be stored in a buffer by accepting the write I/O instruction, each control module of the storage apparatus 100 in this embodiment saves the buffer set data stored in the buffer set (buffer set 5) to be transferred next to the storage apparatus 200 in the save buffer 118.

When each control module saves the buffer set data in the save buffer 118, it sets a buffer set 6 as a new buffer set in which data or the like is stored.

FIG. 15 is a view for describing saving data in the case of accepting another write I/O instruction in a state in which the buffer set 5 is saved in the storage apparatus 100 in the storage system according to this embodiment.

When each control module accepts a new write I/O instruction in a state in which the buffer set data stored in the buffer set 5 is saved, it stores data corresponding to the accepted write I/O instruction in its storage device and stores a copy of the data in a buffer set 6. The buffer set data stored in the buffer set 6 corresponds to a generation 6.

At this time a generation (generation 5 in FIG. 14, for example) which is older than the generation 6 of the buffer set 6 is saved in the save buffer 118, so each control module saves the buffer set data stored in the buffer set 6 in the save buffer 118. When each control module accepts the next write I/O instruction from the host computer, it stores data corresponding to the accepted write I/O instruction in its storage device and stores a copy of the data in a buffer set 7. The buffer set data stored in the buffer set 7 corresponds to a generation 7.

When the buffer set 1 which is in use is freed, each control module reads out the buffer set data corresponding to the generation 5 stored in the save buffer 118 and stores it in the buffer set 1. In this embodiment "freeing" means that a buffer set is put into an unused state.

Figure 16:
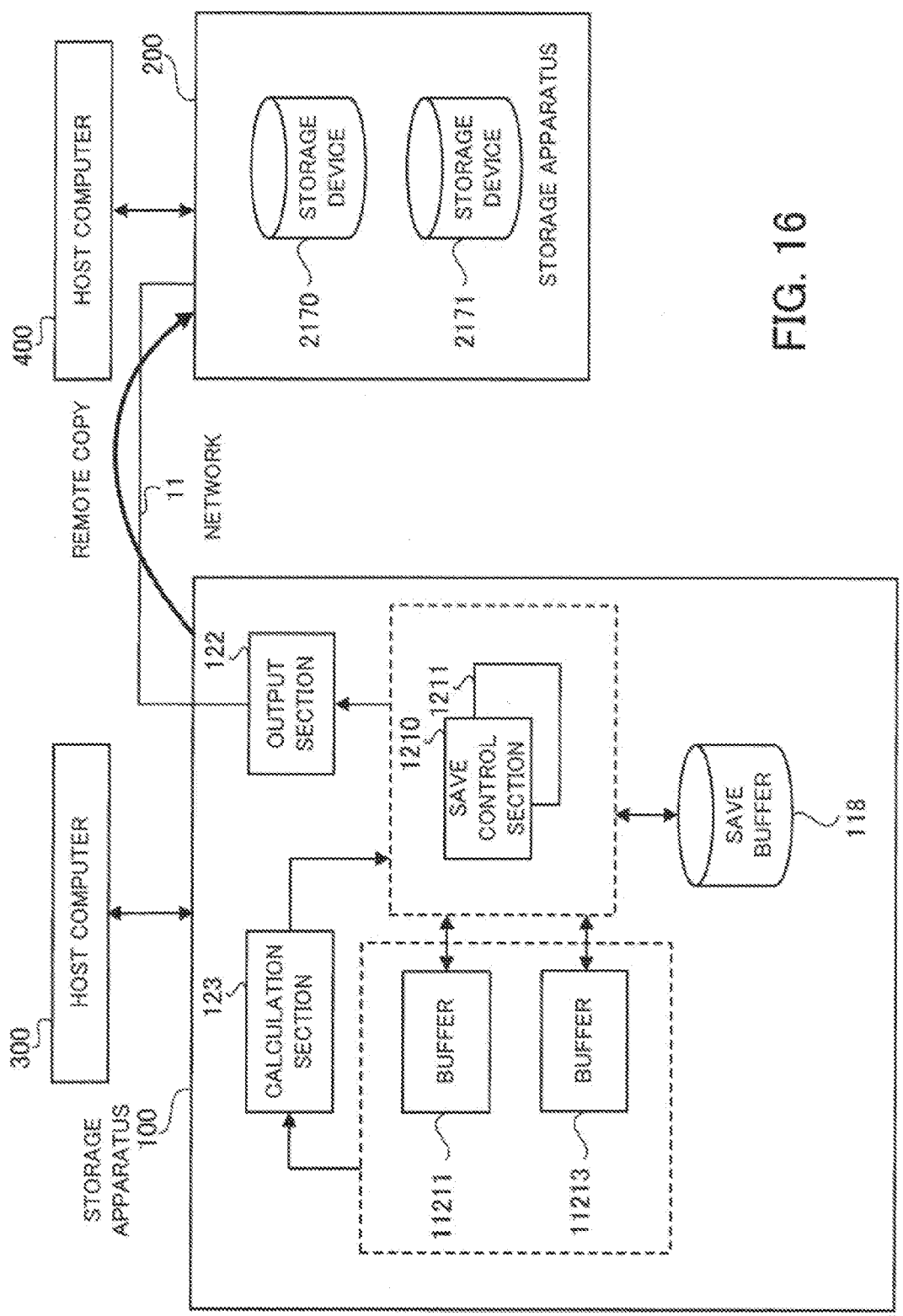
FIG. 16 is a block diagram of a storage apparatus in the storage system according to the second embodiment which illustrates the function.

FIG. 16 is a block diagram of the storage apparatus in the storage system according to the second embodiment which illustrates the function. The storage apparatus 100 in this embodiment is connected to the storage apparatus 200 via the network 11. The storage apparatus 100 is connected to the host computer 300. The storage apparatus 200 is connected to the host computer 400. The storage apparatus 100 transfers data for remote copy sent from the host computer 300 to the storage apparatus 200 via the network 11. By doing so, remote copy is performed. The storage apparatus 100 includes save control sections 1210 and 1211, an output section 122, buffers 11211 and 11213, and a save buffer 118. The storage apparatus 200 includes storage devices 2170 and 2171.

The save control sections 1210 and 1211 perform writeback or staging. In the case of writeback, the save control sections 1210 and 1211 read out buffer set data associated with each other from buffers (buffers 11211 and 11213, for example) included in control modules, and save the buffer set data in the save buffer 118. In the case of staging, the save control sections 1210 and 1211 distribute and store buffer set data saved in the save buffer 118 in the buffers included in the control modules. In this case, the save control sections 1210 and 1211 continuously perform writeback or staging according to the order in which storage areas of the save buffer 118 which store plural pieces of buffer set data that are objects of writeback or staging are arranged.

That is to say, when the save control sections 1210 and 1211 save data from the buffer 11211 and the like to the save buffer 118, the save control sections 1210 and 1211 continuously save the data according to the order in which storage areas of the save buffer 118 in which the saved data is to be stored are arranged. When the save control sections 1210 and 1211 store data saved in the save buffer 118 in the buffer 11211 and the like, the save control sections 1210 and 1211 read out the data saved in the save buffer 118 according to the order in which storage areas of the save buffer 118 in which the saved data is stored are arranged. By doing so, efficiency in access to the save buffer 118 can be increased. Generations indicative of the order of a writeback process or a staging process are set in buffer set data. In addition, buffer set data is associated with each other according to generation by buffer set information. In this case, buffer set data functions as a data group.

In this case, a calculation section 123 calculates the number of pieces of buffer set data which are objects of writeback or staging and for which writeback or staging is performed continuously on the basis of the number of blocks stored in the buffers 11211 and 11213. The save control sections 1210 and 1211 continuously perform writeback or staging by the calculated number of pieces of buffer set data in the order in which storage areas of the save buffer 118 in which these pieces of buffer set data are to be stored or are stored are arranged successively.

As a result, when the save control sections 1210 and 1211 save in the save buffer 118 at writeback time or read out buffer set data from the save buffer 118 at staging time, the save control sections 1210 and 1211 perform a writeback process or a staging process in block. By doing so, the total of seek time in the save buffer 118 can be reduced.

In addition, in this embodiment it is assumed that the save control sections 1210 and 1211 classify and store buffer set data in storage areas of the save buffer 118 according to writeback process or staging process. Furthermore, it is assumed that the save control sections 1210 and 1211 perform setting so that buffer set data will be arranged consecutively according to generation in storage areas of the save buffer 118.

The save control sections 1210 and 1211 perform writeback for plural pieces of buffer set data which are objects of the writeback in order of generation in consecutive storage areas of the save buffer 118. By doing so, the plural pieces of buffer set data are stored consecutively in the storage areas of the save buffer 118 in order of generation. In addition, the save control sections 1210 and 1211 perform staging for plural pieces of buffer set data which are objects of the staging in order of generation. By doing so, the buffer set data is read out in order of generation at staging time. Accordingly, the buffer set data is read out in the order in which storage areas of the save buffer 118 are arranged.

When the save control sections 1210 and 1211 save buffer set data in the save buffer 118 at writeback time or read out buffer set data from the save buffer 118 at staging time, the save control sections 1210 and 1211 perform a writeback process or a staging process in order of generation in this way. By doing so, the total of seek time in the save buffer 118 can be reduced.

Moreover, the save control sections 1210 and 1211 perform staging for buffer set data assigned thereto. If an abnormality has occurred in a save control section other than the save control sections 1210 and 1211, then the save control sections 1210 and 1211 continuously perform staging for the buffer set data assigned for staging to the save control sections 1210 and 1211 and then buffer set data assigned for staging to the save control section in which an abnormality has occurred.

If there are plural pieces of buffer set data which are objects of staging, then the save control sections 1210 and 1211 perform staging for the plural pieces of buffer set data in the order in which storage areas of the save buffer 118 in which the plural pieces of buffer set data are stored are arranged successively according to how the network 11 is used.

The output section 122 outputs in block buffer set data including data stored in the buffers 11211 and 11213. As a result, data which is sent from the host computer 300 and which is stored in the buffers 11211 and 11213 is transferred directly to the storage apparatus 200 via the network 11, or is saved temporarily in the save buffer 118, is stored again in the buffers 11211 and 11213, and is transferred to the storage apparatus 200 via the network 11. The data is then stored in the storage devices 2170 and 2171. By doing so, remote copy is performed.

The calculation section 123 calculates a proper number of generations in plural generation access. To be concrete, the calculation section 123 monitors margin time indicative of how much margin wait time for freeing the buffers 11211 and 11213 from the time when a writeback request is made leaves with respect to monitoring time which is a criterion for relinquishing a guarantee of order for maintaining the order of data transferred by remote copy, and predicts, on the basis of the amount of buffer set data stored in the buffers 11211 and 11213, time taken for the save control sections 1210 and 1211 to gain access for continuous staging or writeback. It is conceivable that there will be a proportional relationship between the margin time and plural generation access. Accordingly, the calculation section 123 compares the margin time obtained by monitoring the wait time with a result obtained by predicting time taken to gain access, and performs a calculation on the basis of a comparison result so that the number of pieces of buffer set data for which the save control sections 1210 and 1211 perform continuous staging or writeback will increase. For example, the calculation section 123 may calculate the number of pieces of buffer set data for which the save control sections 1210 and 1211 perform continuous staging or writeback on the basis of the product of the margin time and a determined coefficient.

In addition, the calculation section 123 calculates a proper number of generations in plural generation access in a staging process according to how the network 11 or the like is used. If the usage of the network 11 is high and a communication state is not good, then the calculation section 123 performs a calculation so that the number of pieces of buffer set data for which the save control sections 1210 and 1211 perform continuous staging or writeback will decrease. To be concrete, the calculation section 123 may calculate the number of pieces of buffer set data for which the save control sections 1210 and 1211 perform continuous staging or writeback by dividing a determined coefficient by the line usage of the network 11. Furthermore, the calculation section 123 may calculate a proper number of generations in a staging process by the same method that is used for, for example, a writeback process.

Each of the buffers 11211 and 11213 is part of a memory included in a control module. Data for remote copy sent from the host computer 300 is distributed and stored temporarily in the buffers 11211 and 11213. For example, if the amount of data stored in the buffers 11211 and 11213 increases, the save control sections 1210 and 1211 save data stored in the buffers 11211 and 11213 in the save buffer 118 in order to prevent data from overflowing the buffers 11211 and 11213.

The RAID group included in the storage apparatus 100 is used as the save buffer 118. The save buffer 118 includes divided areas in which buffer set data is stored. The save control sections 1210 and 1211 store data saved from the buffers 11211 and 11213 in storage areas of the save buffer 118. In addition, the save control sections 1210 and 1211 read out data saved in storage areas of the save buffer 118, and store the data in the buffers 11211 and 11213. The save buffer 118 functions as a data group storage section.

Buffer set data is stored in order according to generation in storage areas of the save buffer 118. With the storage apparatus 100 in this embodiment, buffer set data is generated in the order in which requests to access data for remote copy are made. Generations are assigned to the buffer set data generated. The writeback of old-generation buffer set data is performed before the writeback of new-generation buffer set data. After that, the writeback of the new-generation buffer set data is performed. Furthermore, usually the staging of the old-generation buffer set data the writeback of which is performed before the writeback of the new-generation buffer set data is performed before the staging of the new-generation buffer set data. After that, the staging of the new-generation buffer set data is performed. As a result, the storage areas of the save buffer 118 are divided into storage areas in which buffer set data that is an object of writeback is stored and storage areas in which buffer set data that is an object of staging is stored. In addition, buffer set data is arranged successively in order of generation. Furthermore, the storage areas of the save buffer 118 are divided according to control module to which buffer set data stored is assigned.

Accordingly, even if writeback requests or staging requests are made irregularly, access to buffer set data which is to be stored in the save buffer 118 and which is an object of writeback or access to buffer set data which is stored in the save buffer 118 and which is an object of staging is performed in block. In this embodiment consecutive storage areas of the save buffer 118 are accessed in this way at writeback time or staging time. Therefore, seek time can be reduced.

The storage devices 2170 and 2171 are the whole or part of the RAID group included in the storage apparatus 100. Data for remote copy transferred from the storage apparatus 100 via the network 11 is distributed and stored in the storage devices 2170 and 2171.

For convenience of explanation the two save control sections (save control sections 1210 and 1211) and the two buffers (buffers 11211 and 11213) are included in the storage apparatus 100 illustrated in FIG. 16. However, the number of save control sections and buffers included in the storage apparatus 100 may be three or more. In addition, the two storage devices (storage devices 2170 and 2171) are included in the storage apparatus 200 in this embodiment. However, the number of storage devices included in the storage apparatus 200 may be one or three or more.

Figure 17:
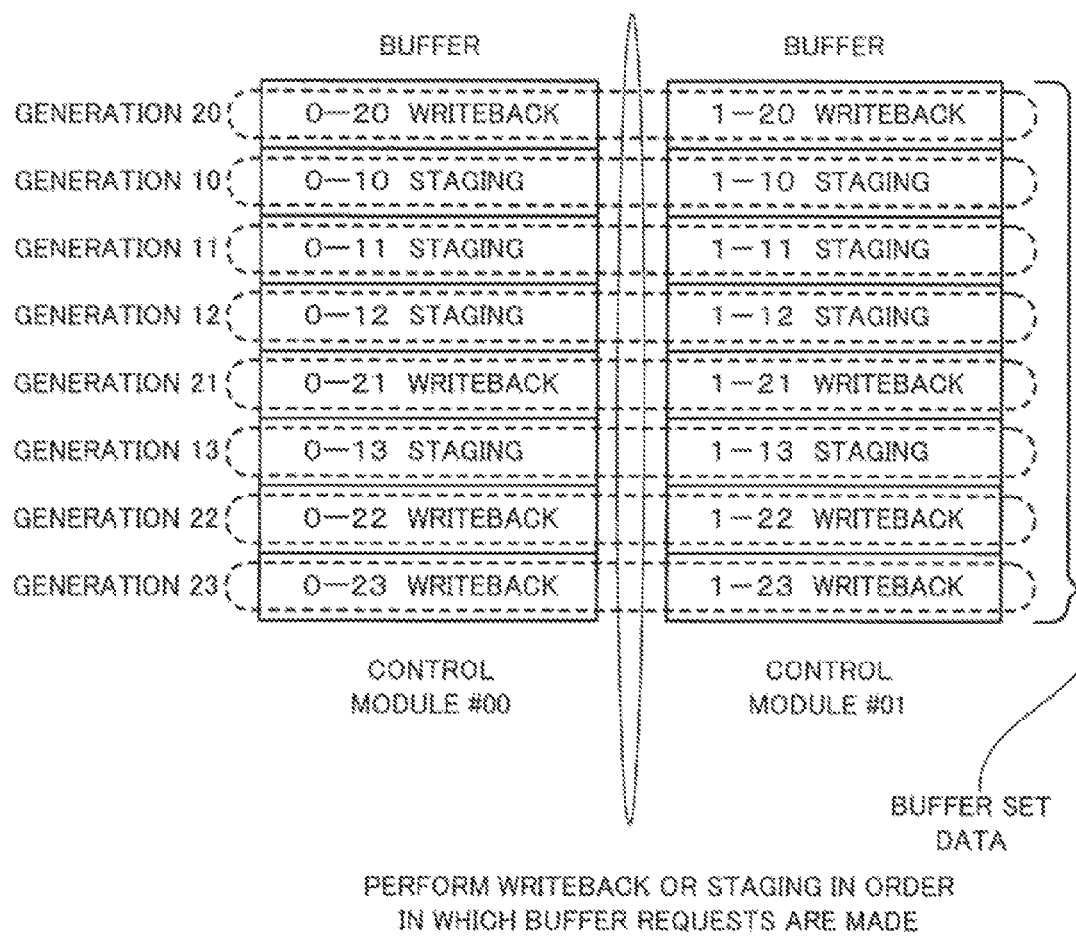
FIG. 17 illustrates the operation of buffers.
Figure 18:
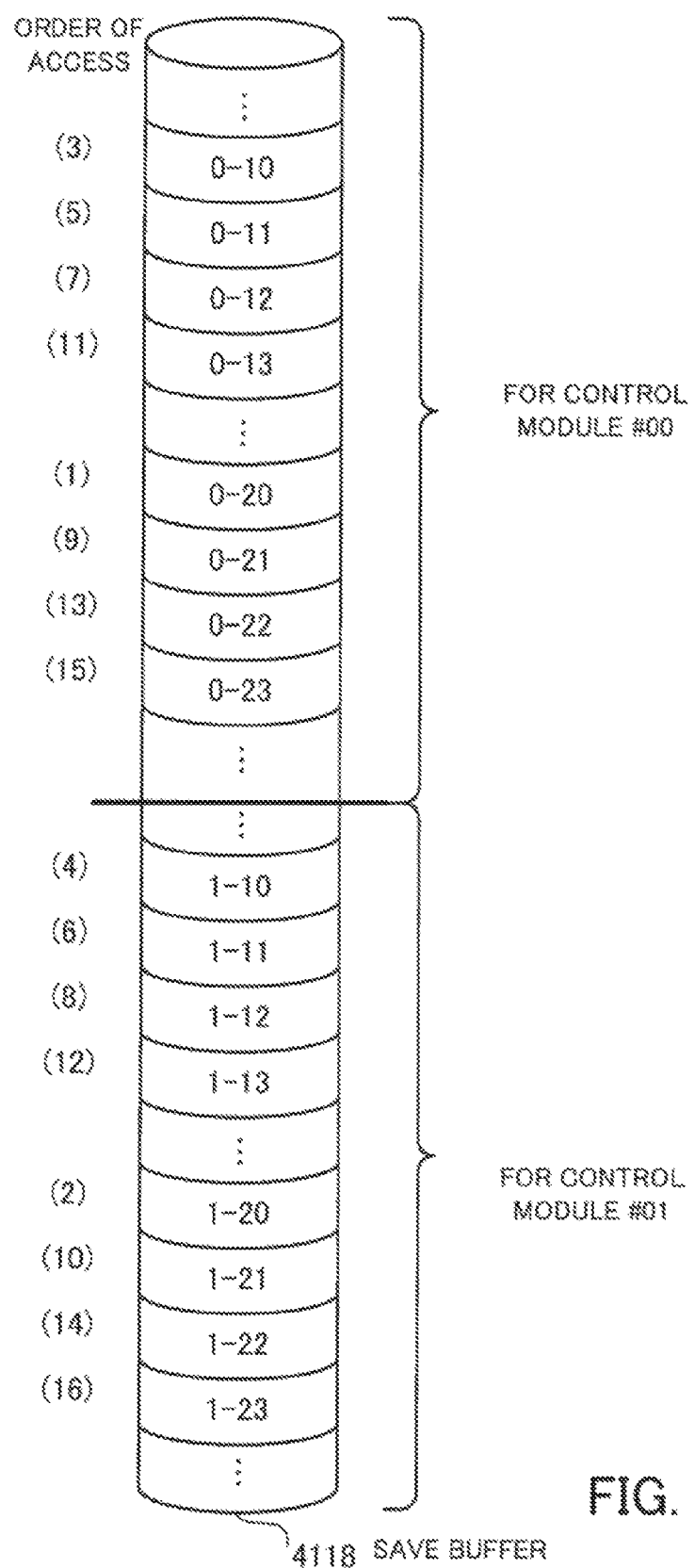
FIG. 18 illustrates the operation of a save buffer.

FIG. 17 illustrates the operation of buffers. FIG. 18 illustrates the operation of a save buffer. The operation of a buffer included in a storage apparatus (not illustrated) taken as an example for comparison will now be described with reference to FIGS. 17 and 18. As illustrated in FIG. 17, the storage apparatus taken as an example for comparison includes control modules #00 and #01 and stores buffer set data which is an object of writeback or staging in buffers according to control module and generation assigned to buffer set data. Numbers included in data included in buffer set data indicate a corresponding control module and generation number. For example, "0-20" included in the left data in buffer set data which is an object of writeback and to which a generation 20 is assigned indicates that this data corresponds to the control module #00 and that the generation 20 is assigned to this data.

The whole or part of a RAID system including a plurality of storage devices is used as a save buffer 4118 illustrated in FIG. 18. This is the same with the save buffer 118 in this embodiment. Furthermore, areas of the save buffer 4118 included in the storage apparatus taken as an example for comparison are associated with the control modules and store buffer set data in order of generation. In addition, it is assumed that a location in the save buffer 4118 at which data in a buffer is stored by writeback is determined in advance.

It is assumed that when buffer requests (staging requests or writeback requests) are made, the storage apparatus taken as an example for comparison accesses the save buffer 4118 and performs writeback or staging in the order in which the requests for the buffers included in a storage device (not illustrated) are made and which is indicated in FIG. 18.

At this time the storage apparatus taken as an example for comparison performs writeback or staging in the order of the buffer set data stored in the buffers illustrated in FIG. 17. For example, the storage apparatus taken as an example for comparison performs writeback or staging in order from the buffer set data stored at the top to the buffer set data stored at the bottom in FIG. 17. Of pieces of data stored at the same level in the buffers of the control modules #00 and #01, the writeback or staging of the piece of data stored in the buffer of the control module #00 is performed before the writeback or staging of the piece of data stored in the buffer of the control module #01. On the basis of this policy, the storage apparatus taken as an example for comparison accesses the areas of the save buffer 4118 in the order indicated in FIG. 18.

The storage apparatus taken as an example for comparison accesses the save buffer 4118 in this way according to generation in the order in which the buffer requests are made. In this case, a location in the save buffer 4118 at which data in a buffer is stored by writeback is determined in advance. Accordingly, discrete areas of the save buffer 4118 are accessed and the original performance of the save buffer 4118 cannot be realized. As a result, a delay in writeback or staging leads to a delay in the operation of the buffers. If a delay in the operation of the buffers increases, it is difficult to maintain the REC disk buffered consistency mode. Accordingly, with the storage apparatus taken as an example for comparison, it may be impossible to guarantee the order of data in remote copy.

Figure 19:
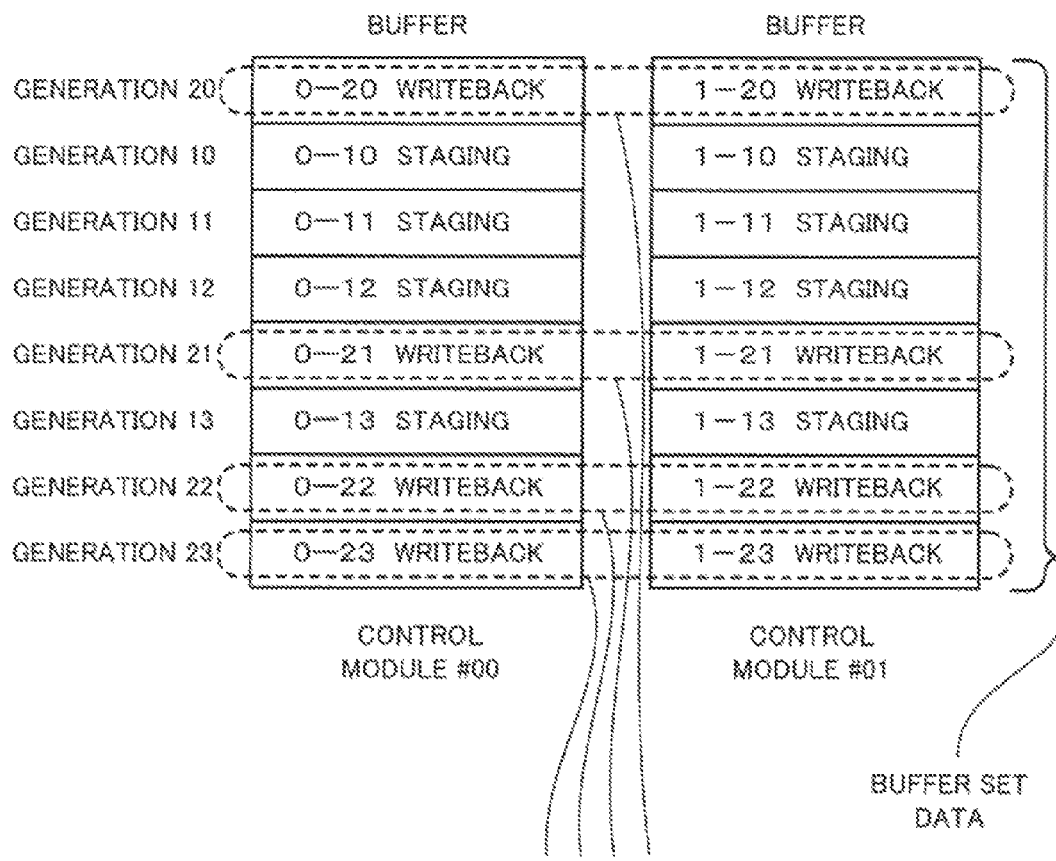
FIG. 19 illustrates the operation of the buffers in the storage system according to the second embodiment.
Figure 20:
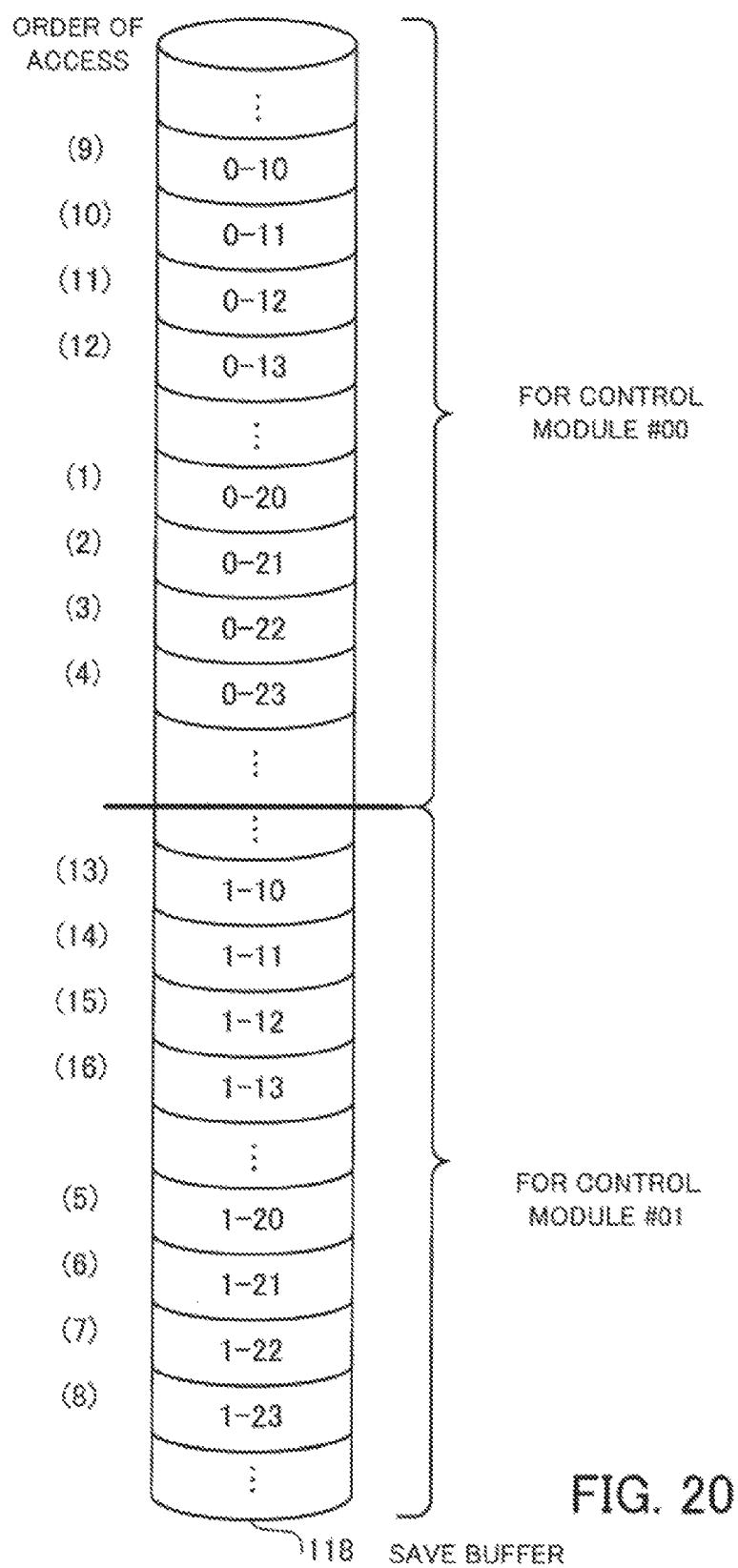
FIG. 20 illustrates the operation of the save buffer in the storage system according to the second embodiment.

FIG. 19 illustrates the operation of the buffers in the storage system according to the second embodiment. FIG. 20 illustrates the operation of the save buffer in the storage system according to the second embodiment. The operation of the buffers in a plural generation access process by the storage apparatus 100 in this embodiment will be described with reference to FIGS. 19 and 20.

With the storage apparatus 100 in this embodiment, as illustrated in FIG. 19, buffer set data which is an object of writeback and buffer set data which is an object of staging are stored in the buffer 11211 and so on according to generation. In addition, the storage apparatus 100 includes the control modules #00 and #01 and stores buffer set data which is an object of writeback and buffer set data which is an object of staging in the buffers according to control module and generation.

When a buffer request is made, the storage apparatus 100 extracts only buffer set data which is an object of a writeback or staging request the type of which is the same as that of the buffer request. For example, when a writeback request is made, the storage apparatus 100 extracts, as illustrated in FIG. 19, only buffer set data which is an object of a writeback request the type of which is the same as that of the buffer request from the buffers of the control modules #00 and #01.

The storage apparatus 100 then accesses the save buffer 118 and performs writeback for the extracted buffer set data which is an object of a writeback. The whole or part of a RAID system including a plurality of storage devices is used as the save buffer 118. In addition, the save buffer 118 includes a plurality of logical units. Furthermore, storage areas of the save buffer 118 of the storage apparatus 100 are associated with the control modules and store buffer set data in order of generation. It is assumed that a location in the save buffer 118 at which data in a buffer is stored by writeback is determined in advance.

At this time the storage apparatus 100 performs, as illustrated in FIG. 20, scheduling so that it will access the save buffer 118 in the order in which the save buffer 118 can be used efficiently. To be concrete, the storage apparatus 100 performs writeback for the extracted buffer set data which is an object of a writeback according to control module in order of generation assigned to buffer set data stored in the buffers illustrated in FIG. 19. On the basis of this policy, the storage apparatus 100 accesses the storage areas of the save buffer 118 in the order indicated in FIG. 20. In this example, the case where a writeback request is made is described. The same applies to the case where a staging request is made.

As stated above, a location in the save buffer 118 at which data in a buffer is stored by writeback is determined in advance. Accordingly, the storage apparatus 100 in this embodiment sets the order of access to the save buffer 118 so that access to the save buffer 118 for writeback will be performed in block, so that access to the save buffer 118 for staging will be performed in block, and so that storage areas of the save buffer 118 which are consecutive or near to one another will be accessed successively. As a result, time taken to perform writeback or staging is reduced. Furthermore, efficiency in the operation of the buffers is increased and the maintenance of a guarantee of the order of data in remote copy by the storage apparatus 100 can be promoted.

The save buffer 118 includes the plurality of logical units and these logical units are assigned to the control modules included in the storage apparatus 100. As a result, the control modules can simultaneously access logical units of the save buffer 118 assigned thereto.

Figure 21A:
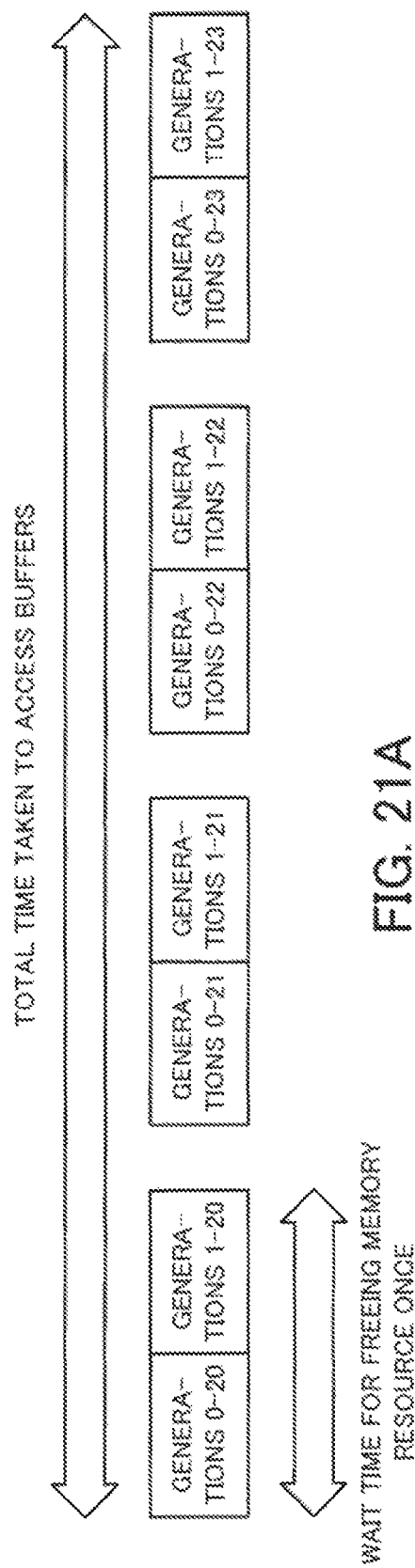
FIGS. 21A and 21B illustrate wait time for the freeing of a memory resource at buffer access time.
Figure 21B:
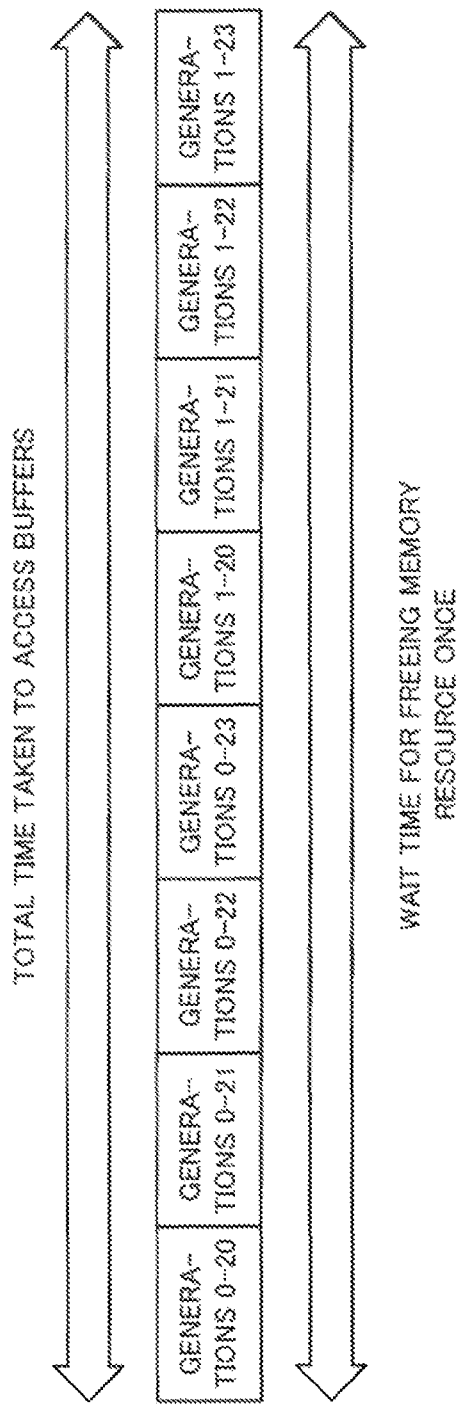

FIGS. 21A and 21B illustrate wait time for the freeing of a memory resource at buffer access time. FIG. 21A illustrates an example of wait time for freeing a memory resource once at buffer access time in the case of handling a writeback or staging request according to generation. FIG. 21B illustrates an example of wait time for freeing a memory resource once at buffer access time in the case of handling a writeback or staging request by plural generation access.

With plural generation access illustrated in FIG. 21B, buffer set data corresponding to plural generations is handled at one time. In this case, the improvement of long-term throughput of a storage apparatus can be expected. With the plural generation access, however, access to buffer set data corresponding to a first generation of the plural generations is begun, handling buffer set data corresponding to a last generation of the plural generations is ended, and a memory source which stores the buffer set data corresponding to the last generation is freed. Total time from the beginning of access to the buffer set data corresponding to the first generation to the freeing of the memory source which stores the buffer set data corresponding to the last generation may become long.

In the case if FIG. 21A, a writeback or staging request is handled according to generation. In this case, a memory source is freed each time handling buffer set data corresponding to each generation ends. Therefore, total time taken to handle requests for buffer set data corresponding to all generations is long. However, wait time for freeing from the beginning of handling the requests to freeing the memory source once is short.

As illustrated in FIG. 21B, on the other hand, if a writeback or staging request is handled by plural generation access, a memory resource is freed only when a plural generation access process for buffer set data corresponding to all generations ends. Therefore, total time taken to handle requests for the buffer set data corresponding to all generations is short, but wait time for freeing from the beginning of handling the requests to freeing the memory source once is long. If a writeback or staging request is handled by plural generation access, wait time for freeing from the beginning of handling the requests to freeing the memory source once is long. Accordingly, there may be a delay in providing a new buffer for storing data sent from the host computer 300. As a result, the necessity of performing remote copy which does not guarantee order may arise in order to rapidly begin performing remote copy for the purpose of protecting the transaction of business performed on a copy source volume. Accordingly, the function of guaranteeing order which the storage apparatus 100 originally has may not be carried out.

Therefore, in this embodiment the number of generations to be accessed in plural generation access is adjusted according to a load on the storage apparatus 100. By doing so, both the maintenance of a guarantee of order and a reduction in wait time for freeing a memory resource are realized. The details will be described in FIGS. 25 and 26.

Figure 22:
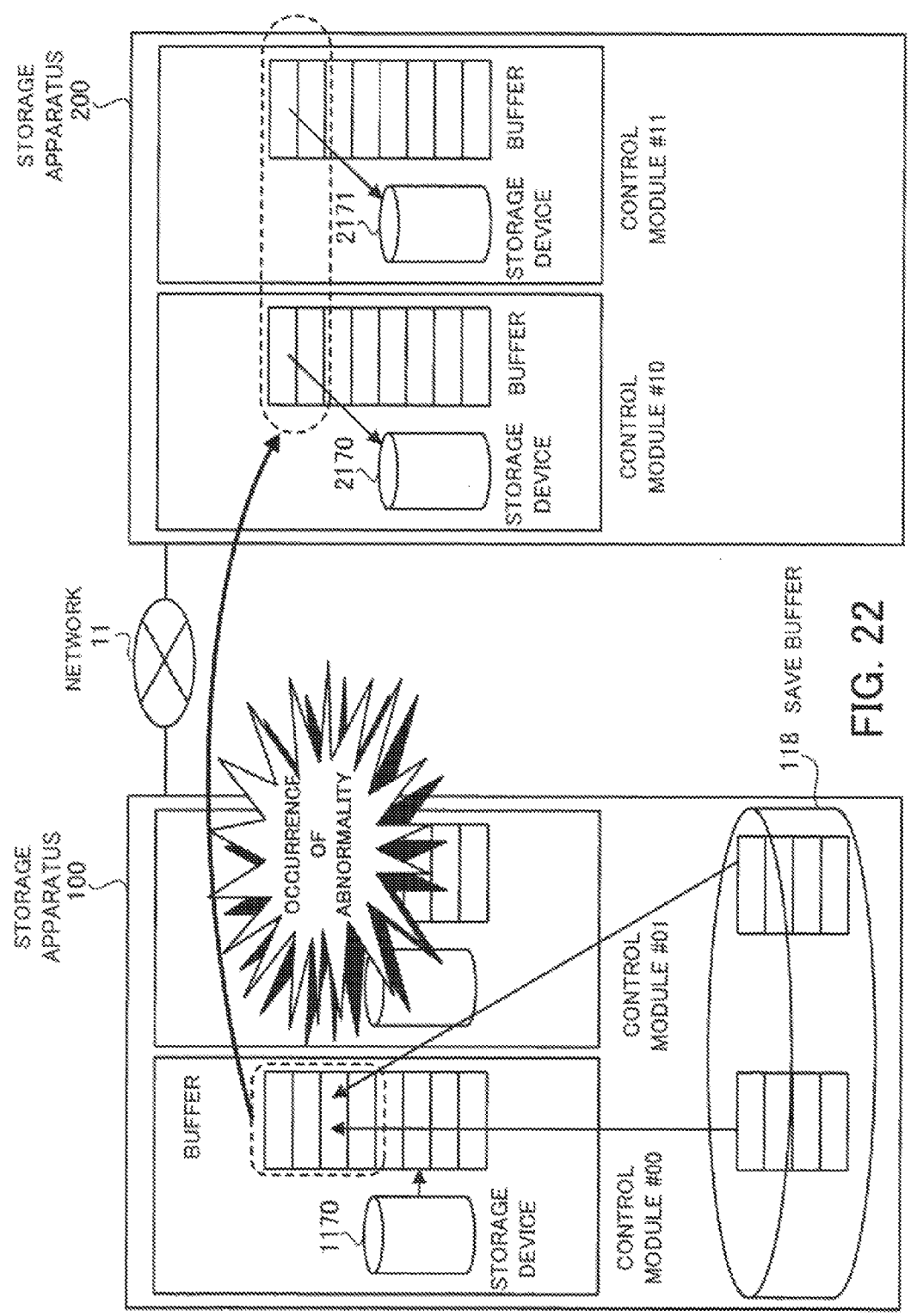
FIG. 22 illustrates remote copy performed in the storage system according to the second embodiment at the time of the occurrence of an abnormality in a control module.

FIG. 22 illustrates remote copy performed in the storage system according to the second embodiment at the time of the occurrence of an abnormality in a control module.

It is assumed that an abnormality such as a failure has occurred in a control module at staging time when data (buffer set data) saved in the save buffer 118 is written to the buffers 11211 and 11213 for transferring it to the storage apparatus 200. If an abnormality has occurred in a control module or the like in this way in plural generation access, a buffer included in the control module in which an abnormality has occurred cannot be used and the case where the number of buffers at staging time is smaller than that of buffers at writeback time may arise.

The buffer set data staged from the save buffer 118 to the buffers is transferred to the storage apparatus 200 via the network 11. By doing so, remote copy is performed. If traffic between the storage apparatus is limited because of, for example, a failure in communication via the network 11, the amount of data transferred for remote copy decreases according to the limitation of traffic. Accordingly, it is necessary to determine a proper number of generations to be accessed in plural generation access in staging according to the condition and the like of the network 11.

In this embodiment the staging of the buffer set data assigned to the control module in which an abnormality has occurred is performed by a control module in a normal state at staging time in plural generation access in order to solve these problems. In addition, the number of generations to be staged is adjusted in the case of the occurrence of an abnormality in a control module or according to the condition and the like of the network 11. The details will be described later in FIGS. 28 and 29.

Figure 23:
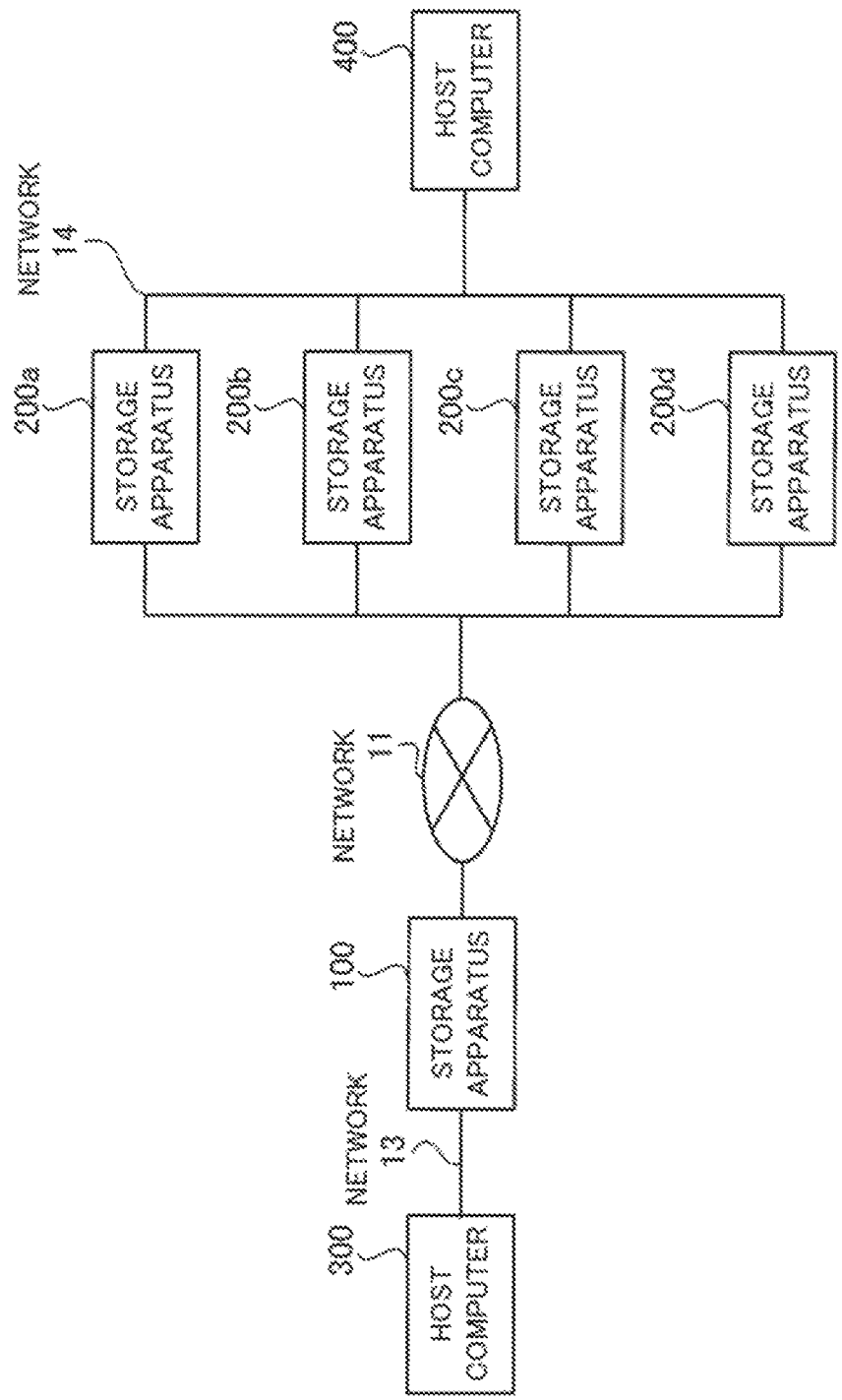
FIG. 23 illustrates how to connect storage apparatus in the storage system according to the second embodiment.

FIG. 23 illustrates how to connect storage apparatus in the storage system according to the second embodiment. As illustrated in FIG. 23, the storage apparatus 100 in this embodiment is connected to a host computer 300 via a network 13 and is connected to storage apparatus 200a, 200b, 200c, and 200d via a network 11. The storage apparatus 200a through 200d are connected to a host computer 400 via a network 14. The storage apparatus 100 illustrated in FIG. 23 can perform remote copy by selecting any of the storage apparatus 200a through 200d. In addition, it is assumed that the host computer 400 can be connected to any of the storage apparatus 200a through 200d for acquiring data.

When remote copy is performed between the storage apparatus 100 and one (storage apparatus 200b, for example) of the storage apparatus 200a through 200d selected, a fall in transfer rate in the remote copy and a delay in data transfer may arise in the case of a communication state being bad, for example, in the case of the line usage of the network 11 being high or the line capability of the network 11 being small. In such a case, the amount of buffer set data accumulated in a save buffer of the storage apparatus 100 increases. Therefore, in this embodiment the storage apparatus 100 sends data for timing to a connected enclosure via a line, such as the network 11, used for communication, and determines line capability from response time from the time when the data for timing is sent to the time when a response to the data for timing reaches the storage apparatus 100.

The number of generations to be accessed in plural generation access in a staging process is changed according to the line capability at transfer time. If the line capability is large, then a large number of generations are accessed in plural generation access. If the line capability is small, then a small number of generations are accessed in plural generation access. By doing so, an optimum number of generations are accessed in plural generation access according to the condition of a network. As a result, if the line capability is small, then the number of generations accessed in plural generation access is reduced and time taken to complete the plural generation access is reduced. This prevents buffers of the storage apparatus 100 and the connected enclosure from being used for a long time. Accordingly, efficiency in remote copy transfer which guarantees order can be increased.

FIG. 24 is a flow chart of a procedure for a plural generation access process in the storage system according to the second embodiment.

The storage apparatus 100 in this embodiment transfers data for remote copy which guarantees order to the storage apparatus 200 via the network 11 by plural generation access. When the storage apparatus 100 in this embodiment is in operation, it waits for a buffer request, that is to say, a writeback request to write buffer set data stored in the buffers 11211 and 11213 of the storage apparatus 100 to the save buffer 118 or a staging request to write buffer set data saved in the save buffer 118 to the buffers 11211 and 11213. The plural generation access process indicated in FIG. 24 will now be described in order of step number.

(S11) A save control section (save control section 1210, for example) of the storage apparatus 100 determines whether a buffer request, that is to say, a staging or writeback request is made. If a buffer request is made, then S12 is performed next. On the other hand, if a buffer request is not made, then S11 is repeated.

(S12) The save control section 1210 determines whether the buffer request the making of which is determined in S11 is a writeback request. If the buffer request the making of which is determined in S11 is a writeback request, then S13 is performed next. On the other hand, if the buffer request the making of which is determined in S11 is not a writeback request, then S14 is performed next.

(S13) The save control section 1210 performs a writeback process (described later in FIGS. 25 and 26). After that, S11 is performed.

(S14) The save control section 1210 performs a staging process (described later in FIGS. 28 and 29). After that, S11 is performed.

Figure 25:
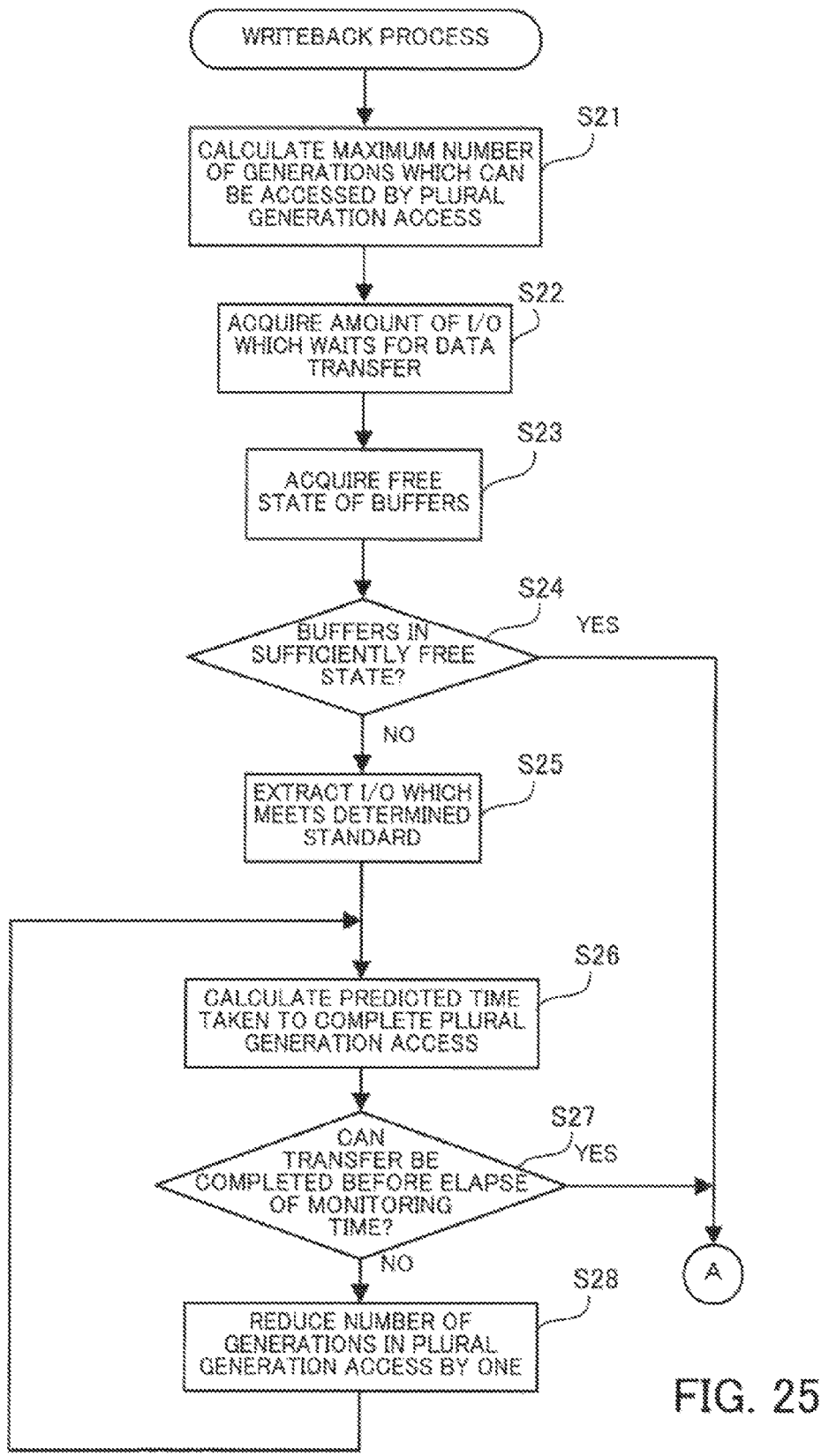
FIG. 25 is a flow chart of a procedure for a writeback process in the storage system according to the second embodiment.
Figure 26:
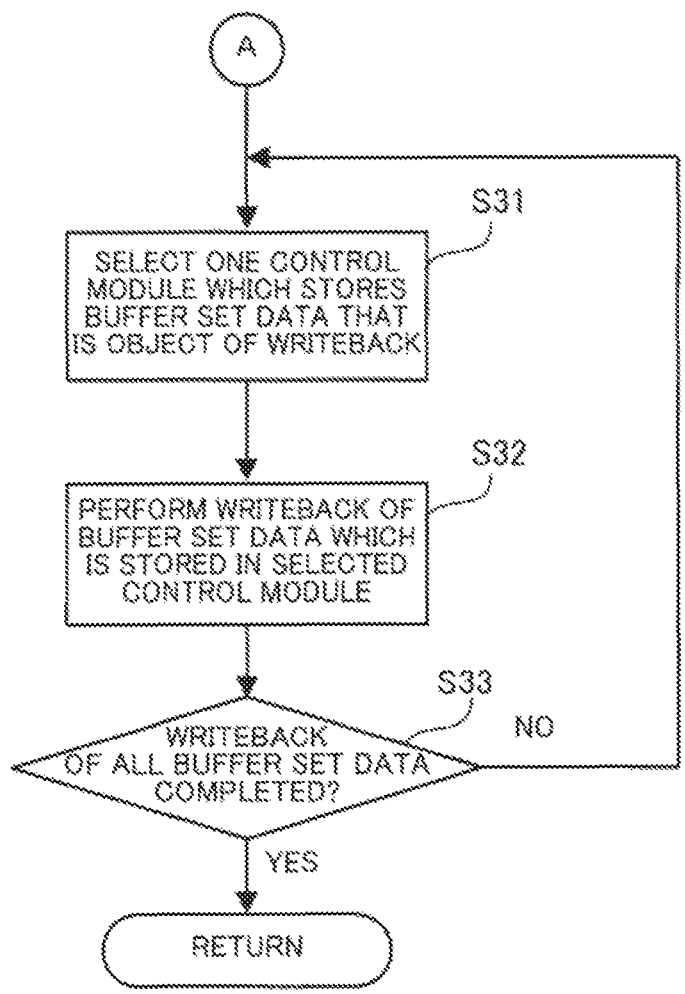
FIG. 26 is a flow chart of a procedure for the writeback process in the storage system according to the second embodiment.

FIGS. 25 and 26 are flow charts of a procedure for a writeback process in the storage system according to the second embodiment.

When a writeback request is made in a plural generation access process, the storage apparatus 100 in this embodiment performs a writeback process. The writeback process indicated in FIGS. 25 and 26 will now be described in order of step number.

(S21) The calculation section 123 calculates the maximum number of generations which can be accessed by plural generation access.

(S22) The calculation section 123 acquires the amount of I/O which waits for transfer from the I/O monitoring table 1126a.

(S23) The calculation section 123 acquires a free state of the buffers 11211 and 11213 which can be used for writeback.

(S24) On the basis of the free state of the buffers 11211 and 11213 acquired in S23, the calculation section 123 determines whether a margin is left in the buffers 11211 and 11213 and whether the buffers 11211 and 11213 are in a sufficiently free state. If the buffers 11211 and 11213 are in a sufficiently free state (YES in S24), then S31 (FIG. 26) is performed next in order to perform plural generation access in which the number of generations accessed is largest. On the other hand, if the buffers 11211 and 11213 are not in a sufficiently free state (NO in S24), then S25 is performed next.

(S25) The calculation section 123 extracts I/O which meets a determined criterion from the I/O acquired in S22. For example, that the difference between time elapsed and monitoring time must be shorter than determined time or that the sum of time elapsed and predicted time taken to process the amount of I/O must reach monitoring time can be set as the determined criterion.

(S26) The calculation section 123 calculates an I/O amount corresponding to each generation assigned to buffer set data stored in the buffers for the I/O extracted in S25, and calculates predicted time (FIG. 8) taken to complete plural generation access on the basis of the I/O amount corresponding to each generation assigned to the buffer set data. At this time the calculation section 123 calculates predicted time taken to complete plural generation access for generations assigned to all the buffer set data stored in the buffers. On the other hand, if the number of generations is reduced in S28 described later, then the calculation section 123 calculates predicted time taken to complete plural generation access for generations after the reduction the number of which is the newest.

(S27) The calculation section 123 compares the predicted time calculated in S26 with monitoring time (FIG. 7) and determines whether transfer can be completed after the making of a writeback request and before the elapse of the monitoring time. If transfer can be completed after the making of the writeback request and before the elapse of the monitoring time (YES in S27), then S31 is performed next. On the other hand, if transfer cannot be completed after the making of the writeback request and before the elapse of the monitoring time (NO in S27), then S28 is performed next.

(S28) The calculation section 123 reduces the number of the generations for which the predicted time taken to complete plural generation access is calculated in S26 by one. After that, S26 is performed.

(S31) A save control section (save control section 1210, for example) of the storage apparatus 100 selects one control module which stores buffer set data that is an object of writeback. At this time one of a plurality of save control sections included in the control modules of the storage apparatus 100 acquires the state of buffers included in the control modules of the storage apparatus 100 and selects one control module on the basis of results acquired.

(S32) A save control section of the control module selected in S31 performs the writeback of the buffer set data which is an object of writeback and which is stored in the selected control module.

(S33) The save control section 1210 determines whether the writeback of all of buffer set data which is an object of writeback has been completed. If the writeback of all of the buffer set data which is an object of writeback has been completed (YES in S33), then the procedure returns to a plural generation access process. On the other hand, if there is buffer set data the writeback of which has not been completed yet (NO in S33), then S31 is performed next.

Figure 27:
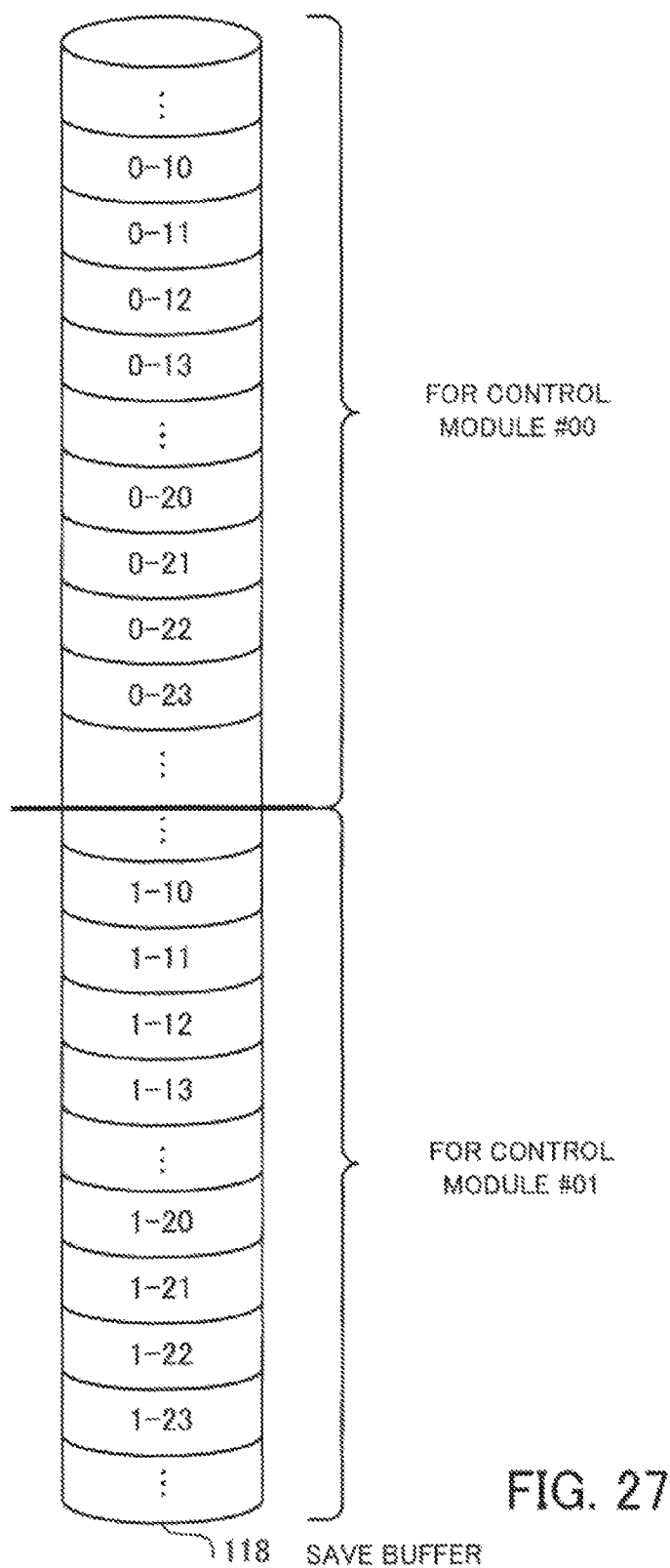
FIG. 27 illustrates the operation of a save buffer in single generation access and plural generation access in the storage system according to the second embodiment.

FIG. 27 illustrates the operation of a save buffer in single generation access and plural generation access in the storage system according to the second embodiment.

A comparison between predicted freeing wait time (single generation) in access according to generation (single generation access) and predicted freeing wait time (plural generations) in plural generation access will be described with reference to the examples indicated in FIGS. 8 and 27. First, as indicated in FIG. 8, it is assumed that time (predicted freeing wait time (single generation)) taken to perform the writeback of the generations 20, 21, 22, and 23 are 2, 5, 1, and 2 seconds respectively.

The difference in the order of access to the save buffer 118 between predicted freeing wait time (single generation) and predicted freeing wait time (plural generations) will be described by the use of the generations 20 through 23 illustrated in FIGS. 19 and 20.

If the writeback of the generations 20 and 21 is performed, the order of access in single generation access and plural generation access are as follows.

Access to the generations 20 and 21 in single generation access is performed in order of generation. With the same generations access to one control module (control module #00, for example) is performed preferentially. In the example indicated in FIG. 27, single generation access is performed in the order of (0-20)→(1-20)→(0-21)→(1-21).

Access to the generations 20 and 21 in plural generation access is performed according to control module. In the same control module access is performed in order of generation. In the example illustrated in FIG. 27, plural generation access is performed in the order of (0-20)→(0-21)→(1-20)→(1-21).

If the writeback of the generations 20, 21, and 22 is performed, the order of access in single generation access and plural generation access are as follows.

In the example indicated in FIG. 27, access to the generations 20, 21, and 22 in single generation access is performed in the order of (0-20)→(1-20)→(0-21)→(1-21)→(0-22)→(1-22). This is the same with the above access to the generations 20 and 21 in single generation access.

In the example indicated in FIG. 27, access to the generations 20, 21, and 22 in plural generation access is performed in the order of (0-20)→(0-21)→(0-22)→(1-20)→(1-21)→(1-22). This is the same with the above access to the generations 20 and 21 in plural generation access.

If the writeback of the generations 20, 21, 22, and 23 is performed, the order of access in single generation access and plural generation access are as follows.

In the example indicated in FIG. 27, access to the generations 20, 21, 22, and 23 in single generation access is performed in the order of (0-20)→(1-20)→(0-21)→(1-21)→(0-22)→(1-22)→(0-23)→(1-23). This is the same with the above access to the generations 20 and 21 in single generation access.

In the example indicated in FIG. 27, access to the generations 20, 21, 22, and 23 in plural generation access is performed in the order of (0-20)→(0-21)→(0-22)→(0-23)→(1-20)→(1-21)→(1-22)→(1-23). This is the same with the above access to the generations 20 and 21 in plural generation access.

In the case of plural generation access, the writeback of plural generations is performed in block in this way. By doing so, consecutive areas of the save buffer 118 are accessed. Accordingly, seek time the save buffer 118 can be reduced significantly.

In the example indicated in FIG. 8, the sum of predicted freeing wait time (single generation) for the generations 20 and 21 is 7 seconds. On the other hand, predicted freeing wait time (plural generations) for the generations 20 through 21 is 6 seconds because seek time is reduced. Similarly, the sum of predicted freeing wait time (single generation) for the generations 20, 21, and 22 is 8 seconds. On the other hand, predicted freeing wait time (plural generations) for the generations 20 through 22 is 6 seconds because seek time is reduced. The sum of predicted freeing wait time (single generation) for the generations 20, 21, 22, and 23 is 10 seconds. On the other hand, predicted freeing wait time (plural generations) for the generations 20 through 23 is 7 seconds because seek time is reduced. That is to say, compared with access according to generation, plural generation access can reduce wait time for freeing the buffers.

Figure 28:
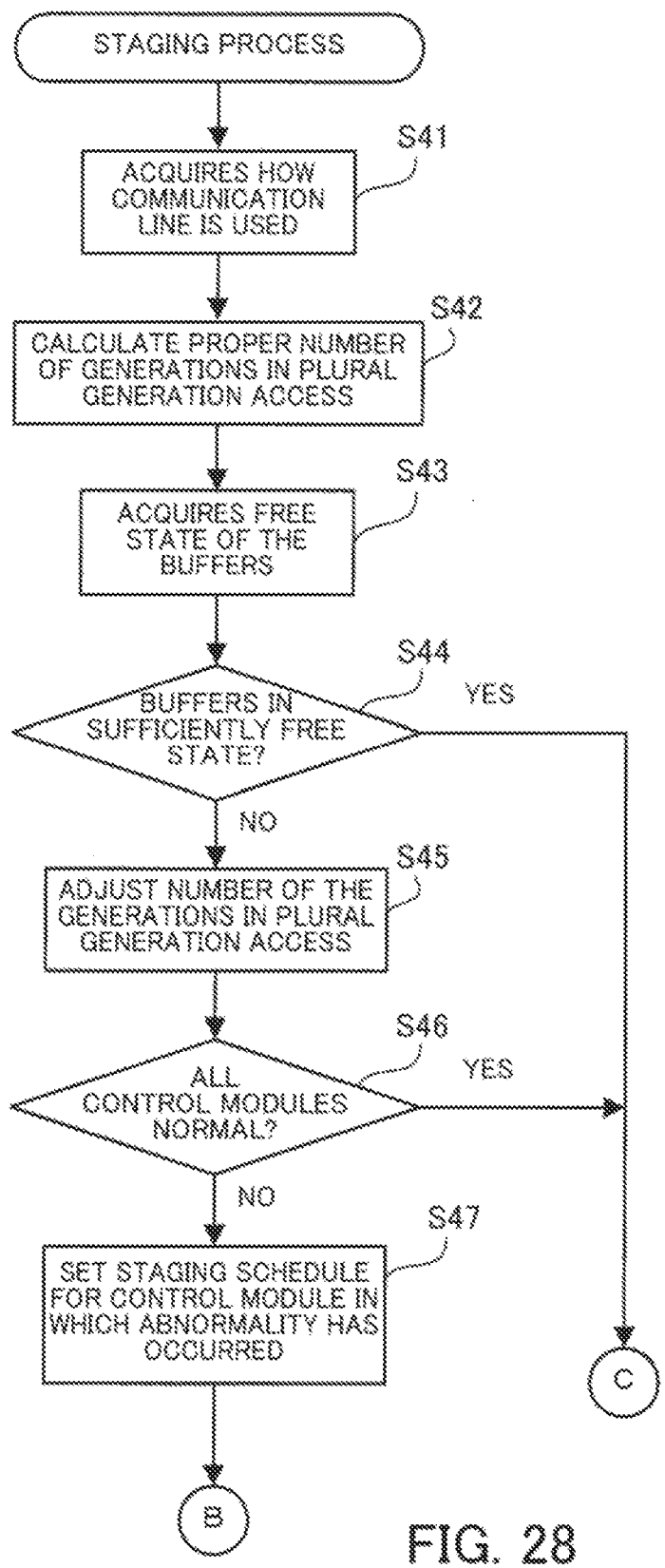
FIG. 28 is a flow chart of a procedure for a staging process in the storage system according to the second embodiment.
Figure 29:
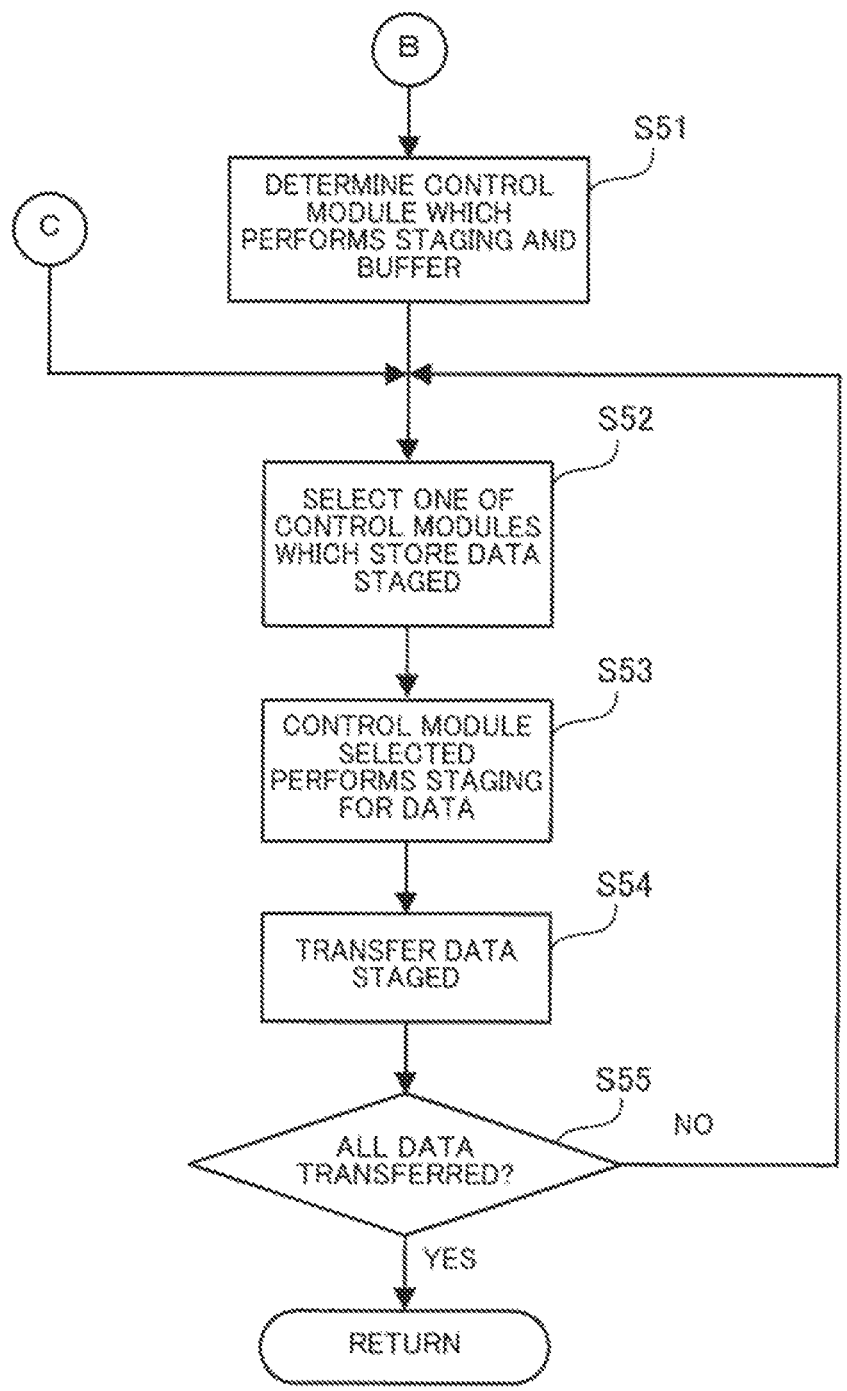
FIG. 29 is a flow chart of a procedure for the staging process in the storage system according to the second embodiment.
Figure 30:
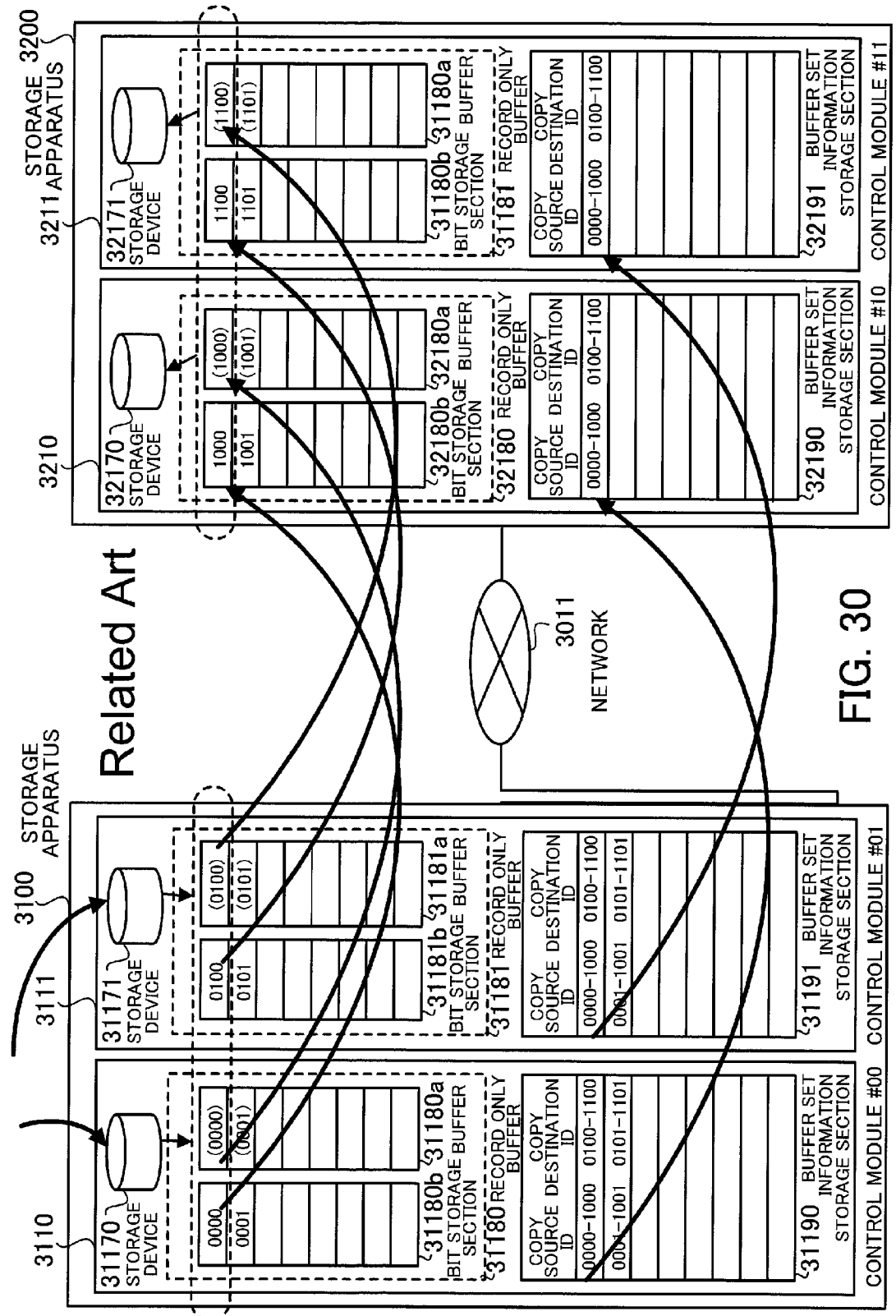
FIG. 30 illustrates a storage system having a remote copy function which guarantees order.
Figure 31:
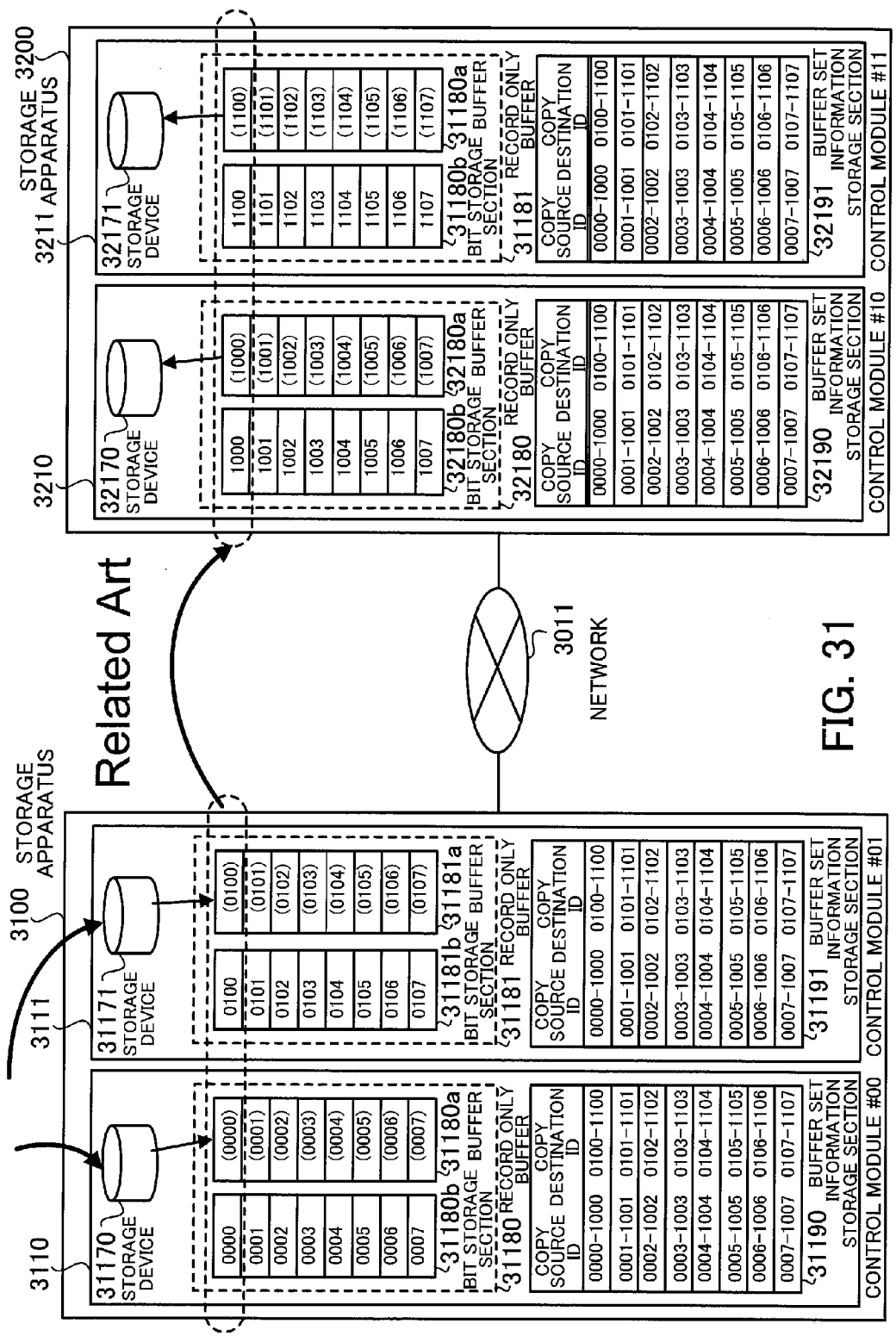
FIG. 31 illustrates the storage system having a remote copy function which guarantees order.

FIGS. 28 and 29 are flow charts of a procedure for a staging process in the storage system according to the second embodiment.

When a staging request is made in a plural generation access process, the storage apparatus 100 in this embodiment performs a staging process. The staging process indicated in FIGS. 28 and 29 will now be described in order of step number.

(S41) The calculation section 123 acquires how a communication line, such as the network 11, connected to another storage apparatus (storage apparatus 200, for example) is used.

(S42) The calculation section 123 calculates a proper number of generations in plural generation access according to the communication state acquired in S41. For example, the calculation section 123 may calculate a proper number of generations in plural generation access in the same way that is indicated in S25 through S28 of FIG. 25 which describes the writeback process.

(S43) The calculation section 123 acquires a free state of the buffers 11211 and 11213 which can be used for staging.

(S44) On the basis of the free state of the buffers 11211 and 11213 acquired in S43, the calculation section 123 determines whether a margin is left in the buffers 11211 and 11213 and whether the buffers 11211 and 11213 are in a sufficiently free state. If the buffers 11211 and 11213 are in a sufficiently free state (YES in S44), then S51 (FIG. 29) is performed next. On the other hand, if the buffers 11211 and 11213 are not in a sufficiently free state (NO in S44), then S45 is performed next.

(S45) The calculation section 123 reduces the number of the generations in plural generation access according to the free state of the buffers 11211 and 11213 acquired in S43 in order to make an adjustment.

(S46) A save control section (save control section 1210, for example) of the storage apparatus 100 determines whether all control modules that store data (buffer set data) to be staged are normal. If all of the control modules are normal (YES in S46), then S52 (FIG. 29) is performed next. On the other hand, if there is a control module in which an abnormality has occurred (NO is S46), then S47 is performed next.

(S47) The save control section 1210 sets a staging schedule for the control module in which an abnormality has occurred.

(S51) The save control section 1210 selects a control module which performs staging for data stored in the control module for which the staging schedule is set in S47 from control modules which are functioning normally. As a result, a buffer to which the data is staged is determined.

(S52) A save control section of the storage apparatus 100 selects one of the control modules which store data (buffer set data) to be staged. In this case, one of a plurality of save control sections included in the storage apparatus 100 according to control module acquires the state of buffers included in the control modules of the storage apparatus 100, and make a selection on the basis of the result acquired.

(S53) A save control section included in the control module selected in S51 performs staging for data which is an object of staging by the control module selected.

(S54) The output section 122 transfers the data for which staging is performed in S53 to the storage apparatus 200 via a communication line such as the network 11.

(S55) The save control section 1210 determines whether all data has been transferred. If all data has been transferred (YES in S55), then the procedure returns to a plural generation access process. On the other hand, if there is data which has not been transferred yet (NO in S55), then S52 is performed next.

In this embodiment the number of generations is adjusted in a writeback process according to a predicted result of time taken to complete plural generation access. The number of generations may also be adjusted in a staging process according to a predicted result of time taken to complete plural generation access.

As described above, the save control sections 1210 and 1211 of the storage apparatus 100 in the second embodiment gain access successively according to storage areas of the save buffer 118. As a result, throughput in access to the save buffer 118 can be enhanced and a fall in efficiency in the function of guaranteeing order in remote copy can be prevented.

In addition, writeback is performed for buffer set data which is an object of writeback in the order in which storage areas of the save buffer 118 are arranged successively. As a result, throughput in access to the save buffer 118 at writeback time can be enhanced and a fall in efficiency in the function of guaranteeing order in remote copy can be prevented.

Furthermore, staging is performed for buffer set data which is an object of staging in the order in which storage areas of the save buffer 118 are arranged successively. As a result, throughput in access to the save buffer 118 at staging time can be enhanced and a fall in efficiency in the function of guaranteeing order in remote copy can be prevented.

Moreover, wait time for freeing buffers is monitored and time necessary for access is predicted. A monitoring result is compared with a prediction result and the number of generations assigned to buffer set data successively handled is calculated on the basis of a comparison result. Staging or writeback is performed successively for the buffer set data corresponding to the calculated number of generations according to storage areas of the save buffer 118. As a result, even if plural generation access is performed, a long wait time for freeing a memory resource can be avoided and a guarantee of order can be fulfilled effectively.

If an abnormality has occurred in a control module, each of the other control modules performs staging successively for part of buffer set data assigned for staging to it and then part of buffer set data assigned for staging to the control module in which an abnormality has occurred. As a result, even if an abnormality has occurred in a control module, operable control modules perform staging for buffer set data in place of the control module and transfer the buffer set data to the storage apparatus 200. This increases the reliability of remote copy.

In addition, staging is performed for buffer set data which is an object of staging in the order in which storage areas of the save buffer 118 are arranged successively according to how the network 11 used for remote copy is utilized. As a result, by performing staging according to how the network 11 used for remote copy is utilized, efficiency in access at staging time can be increased and a fall in efficiency in the function of guaranteeing order in remote copy can be prevented.

Furthermore, a generation indicative of the order of a staging or writeback process is assigned to buffer set data. The storage area of the save buffer 118 is divided so that buffer set data will appear successively in order of generation. Therefore, by accessing the storage areas of the save buffer 118 on the basis of generations assigned to the buffer set data and performing staging or writeback, efficiency in access to the save buffer 118 can be increased. As a result, throughput in access to the save buffer 118 can be enhanced and a fall in efficiency in the function of guaranteeing order in remote copy can be prevented.

Moreover, the storage area of the save buffer 118 is divided so that storage areas after the division will be arranged successively according to control modules to each of which part of buffer set data stored is assigned. Accordingly, each control module in which an abnormality has not occurred performs staging for part of buffer set data assigned thereto and then part of buffer set data assigned to a control module in which an abnormality has occurred by accessing storage areas of the save buffer 118. This can increase efficiency in access to the save buffer 118. As a result, throughput in access to the save buffer 118 in the case of the occurrence of an abnormality in a control module can be enhanced and a fall in efficiency in the function of guaranteeing order in remote copy can be prevented.

The above processes indicated in each embodiment can be realized by making a computer execute a determined program. In this case, a program in which the contents of the processes to be realized are described is provided. This program can be recorded on a computer readable record medium. A computer readable record medium can be a magnetic recording device, an optical disk, a magneto-optical recording medium, a semiconductor memory, or the like. A magnetic recording device can be a hard disk drive, a flexible disk (FD), a magnetic tape (MT), or the like. An optical disk can be a digital versatile disk (DVD), a DVD-RAM, a compact disk-read only memory (CD-ROM), a compact disc-recordable (CD-R), a compact disc-rewritable (CD-RW), or the like. A magneto-optical recording medium can be a magneto-optical disk (MO) or the like.

To place the program on the market, portable record media, such as DVDs or CD-ROMs, on which it is recorded are sold. Alternatively, the program is stored in advance in a storage unit of a server computer and is transferred from the server computer to another computer via a network.

When the computer executes this program, it will store the program, which is recorded on a portable record medium or which is transferred from the server computer, on, for example, its storage unit. Then the computer reads the program from its storage unit and performs processes in compliance with the program. The computer can also read the program directly from a portable record medium and perform processes in compliance with the program. Furthermore, each time the program is transferred from the server computer, the computer can perform processes in turn in compliance with the program it receives.

According to the storage apparatus, the storage apparatus control program, and the storage apparatus control method disclosed, a fall in efficiency in the function of guaranteeing order in remote copy can be prevented.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A storage apparatus including a plurality of storage sections in which data is distributed and stored and an output section which outputs in block a data group including the data stored in each of the plurality of storage sections, the apparatus comprising:
a data group storage section which has storage areas for storing the data group;
a save control section which continuously performs at least one of writeback by which the data group is read out from the plurality of storage sections and by which the data group is saved in the data group storage section and staging by which a data group saved in the data group storage section is distributed and stored in the plurality of storage sections, according to the storage areas of the data group storage section which store a plurality of data groups that are objects of the writeback or the staging; and
a calculation section which calculates a number of data groups for which at least one of the writeback and the staging is continuously performed by the save control section,
wherein:
the save control section performs at least one of the writeback for the plurality of data groups which are objects of the writeback and the number of which is calculated by the calculation section, and the staging for the plurality of data groups which are objects of the staging and the number of which is calculated by the calculation section;
a monitoring time is given as a criterion for relinquishing a guarantee of order for maintaining an order in which the data group outputted from the output section is transferred;
the calculation section monitors a wait time for freeing of the plurality of the storage sections passed since the write back or the staging is requested so as to determine how much margin time is left before the monitoring time expires, predicts time to be taken for the save control section to perform the writeback or the staging continuously, compares the margin time with a result obtained by predicting the time to be taken for the save control section to perform the writeback or the staging continuously, and calculates a number of data groups for which the save control section performs the writeback or the staging continuously on the basis of a comparison result; and
the save control section performs the writeback or the staging in order of a generation for data groups the number of which is calculated by the calculation section, the generation indicating order of processing.

2. The storage apparatus according to claim 1, wherein:
the generation is assigned to the data group, and the data is associated with each other according to the generation; and
the save control section performs the writeback of the plurality of data groups that are objects of the writeback to consecutive storage areas of the data group storage section in order of the generation.

3. The storage apparatus according to claim 2, wherein the save control section performs staging in order of the generation for the plurality of data groups which are objects of the staging.

4. The storage apparatus according to claim 3 further comprising a plurality of save control sections,
wherein:
a part of the plurality of data groups is assigned to each of the plurality of save control sections and each save control section performs staging for the corresponding assigned part of the plurality of data groups, and
when an abnormality has occurred in one of the save control sections, remaining ones of the save control sections perform staging for the part of the plurality of data groups assigned thereto and staging for the part of the plurality of data groups assigned to the save control section in which the abnormality has occurred in order of the generation.

5. The storage apparatus according to claim 3, wherein:
the output section is connected to an output destination via a communication line; and
the save control section performs the staging in order of the generation for the plurality of data groups which are objects of the staging according to how the communication line is used.

6. The storage apparatus according to claim 1, wherein the calculation section calculates the number of data groups according to a condition of the communication line.

7. The storage apparatus according to claim 1 comprising a plurality of save control sections, wherein the storage areas of the data group storage section are arranged successively according to the plurality of save control sections to each of which part of the plurality of data groups stored is assigned.

8. A computer-readable, non-transitory record medium on which a storage apparatus control program for controlling a storage apparatus is recorded, the storage apparatus including a plurality of storage sections in which data is distributed and stored and an output section which outputs in block a data group including the data stored in each of the plurality of storage sections, the program causing a computer to perform a procedure including:

calculating a number of data groups for which at least one of writeback and staging is continuously performed; and continuously performing at least one of the writeback by which the data group is read out from the plurality of storage sections and by which the data group is saved in a data group storage section having storage areas for storing the data group and the staging by which a data group saved in the data group storage section is distributed and stored in the plurality of storage sections according to the storage areas of the data group storage section which store the calculated number of data groups that are objects of the writeback or the staging, wherein:

a monitoring time is given as a criterion for relinquishing a guarantee of order for maintaining an order in which the data group outputted from the output section is transferred; and the procedure further includes monitoring a wait time for freeing of the plurality of the storage sections passed since the write back or the staging is requested so as to determine how much margin time is left before the monitoring time expires, predicting time to be taken for the save control section to perform the writeback or the staging continuously, comparing the margin time with a result obtained by predicting the time to be taken for the save control section to perform the writeback or the staging continuously, and calculating a number of data groups for which the save control section performs the writeback or the staging continuously on the basis of a comparison result; and performing the writeback or the staging in order of a generation for the calculated number of data groups, the generation indicating order of processing.

9. The computer-readable, non-transitory record medium according to claim 8, wherein the procedure further includes calculating the number of data groups according to a condition of the communication line.

10. A storage apparatus control method for controlling a storage apparatus including a plurality of storage sections in which data is distributed and stored temporarily and an output section which outputs in block a data group including the data stored in each of the plurality of storage sections, the method comprising:

calculating a number of data groups for which at least one of writeback and staging is continuously performed; and continuously performing, by a computer, at least one of the writeback by which the data group is read out from the plurality of storage sections and by which the data group is saved in a data group storage section having storage areas for storing the data group and the staging by which a data group saved in the data group storage section is distributed and stored in the plurality of storage sections according to the storage areas of the data group storage section which store the calculated number of data groups that are objects of the writeback or the staging, wherein:

a monitoring time is given as a criterion for relinquishing a guarantee of order for maintaining an order in which the data group outputted from the output section is transferred;

the method further includes monitoring a wait time for freeing of the plurality of the storage sections passed since the write back or the staging is requested so as to determine how much margin time is left before the monitoring time expires, predicting time to be taken for the save control section to perform the writeback or the staging continuously, comparing the margin time with a result obtained by predicting the time to be taken for the save control section to perform the writeback or the staging continuously, and calculating a number of data groups for which the save control section performs the writeback or the staging continuously on the basis of a comparison result; and performing the writeback or the staging in order of a generation for the calculated number of data groups, the generation indicating order of processing.

11. The storage apparatus control method according to claim 10, further including calculating the number of data groups according to a condition of the communication line.

12. A storage apparatus including a plurality of storage sections in which data is distributed and stored and an output section which outputs in block a data group including the data stored in each of the plurality of storage sections, the apparatus comprising:

a data group storage section which has storage areas for storing the data group;

a save control section which continuously performs at least one of writeback by which the data group is read out from the plurality of storage sections and by which the data group is saved in the data group storage section and staging by which a data group saved in the data group storage section is distributed and stored in the plurality of storage sections, according to the storage areas of the data group storage section which store a plurality of data groups that are objects of the writeback or the staging;

wherein:

a generation indicative of order of processing is assigned to the data group, and the data is associated with each other according to the generation;

the save control section performs the writeback of the plurality of data groups that are objects of the writeback to consecutive storage areas of the data group storage section in order of the generation;

the save control section performs staging in order of the generation for the plurality of data groups which are objects of the staging;

a monitoring time is given as a criterion for relinquishing a guarantee of order for maintaining an order in which the data group outputted from the output section is transferred;

the storage apparatus further comprises a calculation section which monitors a wait time for freeing of the plurality of the storage sections passed since the write back or the staging is requested so as to determine how much margin time is left before the monitoring time expires, predicts time to be taken for the save control section to perform the writeback or the staging continuously, compares the margin time with a result obtained by predicting the time to be taken for the save control section to perform the writeback or the staging continuously, and calculates a number of data groups for which the save control section performs the writeback or the staging continuously on the basis of a comparison result; and the save control section performs the writeback or the staging in order of the generation for data groups the number of which is calculated by the calculation section.

* * * * *